(12) United States Patent
Karpman et al.

(10) Patent No.: US 6,263,557 B1
(45) Date of Patent: Jul. 24, 2001

(54) APPARATUS AND METHOD FOR INSERTING ANGLE PLATES IN CHANNEL SHAPED FLANGES OF A DUCT

(75) Inventors: Aleksandr Karpman, Ballwin, MO (US); Michael E. Satterfield, Cahokia, IL (US); Herbert J. Fischer, Imperial, MO (US)

(73) Assignee: Engel Industries, Inc., St. Louis, MO (US)

( * ) Notice: Subject to any disclaimer, the term of this patent is extended or adjusted under 35 U.S.C. 154(b) by 0 days.

(21) Appl. No.: 09/543,528

(22) Filed: Apr. 6, 2000

Related U.S. Application Data

(63) Continuation of application No. 08/801,062, filed on Feb. 14, 1997, now Pat. No. 6,047,466.

(51) Int. Cl.⁷ .................................................. B21D 39/02
(52) U.S. Cl. .................................. 29/509; 29/513; 29/809
(58) Field of Search ...................................... 29/243.5, 509, 29/513, 787, 788, 809, 816, 822; 221/289, 298, 299

(56) References Cited

U.S. PATENT DOCUMENTS

| | | |
|---|---|---|
| 2,895,214 | 7/1959 | Erdman . |
| 2,900,107 | 8/1959 | Erdmann . |
| 2,906,433 | 9/1959 | Erdmann . |
| 2,973,108 | 2/1961 | Gable . |
| 3,023,493 | 3/1962 | Mittermaier . |
| 3,687,168 | 8/1972 | Sherman et al. . |
| 4,038,128 | 7/1977 | Mueller . |
| 4,261,098 | 4/1981 | Lincoln . |
| 4,332,203 | 6/1982 | Flowers . |
| 4,410,206 | 10/1983 | Mez . |
| 4,466,641 | 8/1984 | Heilman et al. . |
| 4,507,836 | 4/1985 | Hiromitsu . |
| 4,564,227 | 1/1986 | Murck . |
| 4,572,553 | 2/1986 | Geldner . |
| 4,579,375 | 4/1986 | Fischer et al. . |
| 4,713,959 | 12/1987 | Bennett . |
| 4,870,749 | 10/1989 | Roy et al. . |
| 4,989,438 | 2/1991 | Simon . |
| 5,090,101 | 2/1992 | Welty . |

(List continued on next page.)

*Primary Examiner*—S. Thomas Hughes
*Assistant Examiner*—Essama Omgba
(74) *Attorney, Agent, or Firm*—Howell & Haferkamp, LC

(57) ABSTRACT

Apparatus for inserting a corner member into channel-shaped flanges of a duct. The corner member has first and second legs. The duct includes longitudinally extending duct panels. The channel-shaped flanges of the duct extend laterally from at least one end of the duct panels. The apparatus a corner member support mechanism adapted for supporting the corner member, a duct moving mechanism, and a pressing mechanism. The duct moving mechanism has a duct pusher moveable between a first position and a second position. The duct pusher imparts a moving force against the duct upon movement of the duct pusher from its first position to its second position. The duct moving mechanism moves the duct toward the corner member and to a position in which adjacent flanges of the duct are in registration with the legs of the corner member upon movement of the duct pusher from its first position to its second position when the corner member is being supported by the corner member support mechanism and when the duct pusher is imparting the moving force against the duct. The pressing mechanism has at least one pressing member moveable between a non-pressing position and a pressing position. The pressing mechanism presses the corner member into the duct flanges upon movement of the pressing member from its non-pressing position to its pressing position when the flanges of the duct are in registration with the legs of the corner member.

6 Claims, 18 Drawing Sheets

U.S. PATENT DOCUMENTS

| | | |
|---|---|---|
| 5,283,944 | 2/1994 | Goodhue . |
| 5,321,880 | 6/1994 | Goodhue . |
| 5,342,100 | 8/1994 | Goodhue . |
| 5,353,616 | 10/1994 | Fischer et al. . |
| 5,358,013 | 10/1994 | McClain . |
| 5,448,815 | 9/1995 | Kolesar . |
| 5,495,652 * | 3/1996 | Kitamura et al. .................. 29/243.5 |
| 5,621,956 * | 4/1997 | Kolesar .............................. 29/243.5 |
| 5,649,347 * | 7/1997 | Cattadoris ............................ 29/252 |
| 5,673,947 * | 10/1997 | De Waal ............................. 285/364 |
| 5,926,937 * | 7/1999 | Goodhue .............................. 29/509 |
| 6,047,466 * | 4/2000 | Karpman et al. ..................... 29/809 |
| 6,065,637 * | 5/2000 | Takada ................................. 221/298 |
| 6,081,985 * | 7/2000 | Fisher et al. ......................... 29/509 |
| 6,098,839 * | 8/2000 | Hunnell ............................... 221/197 |
| 6,158,114 * | 12/2000 | Kaczorowski ........................ 29/818 |

* cited by examiner

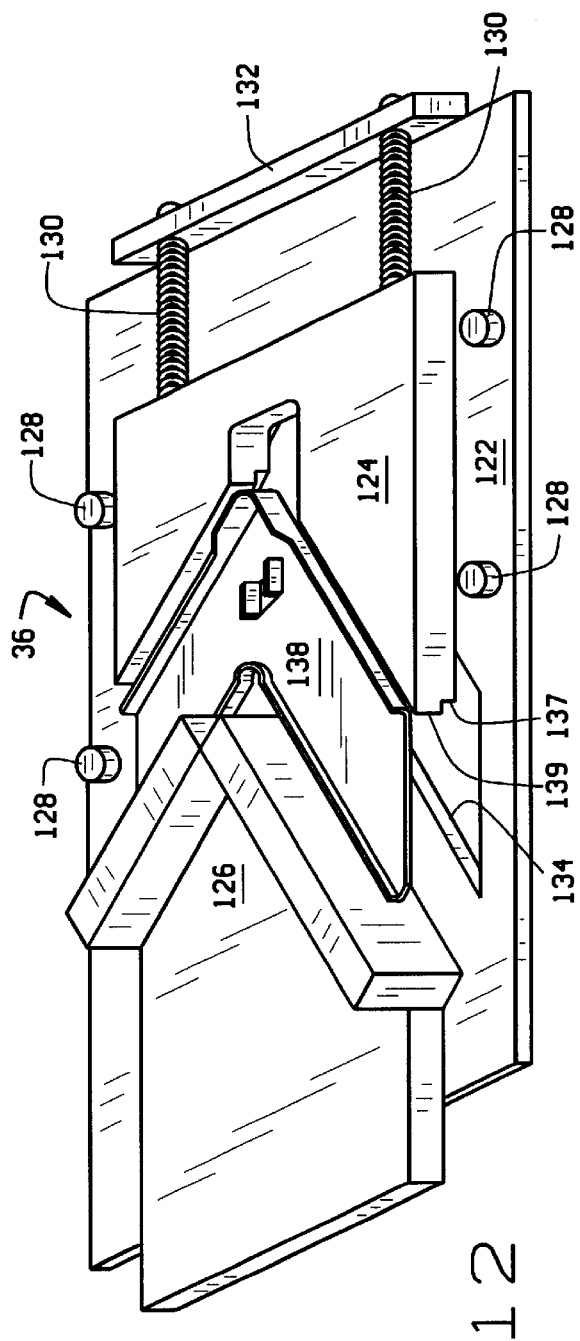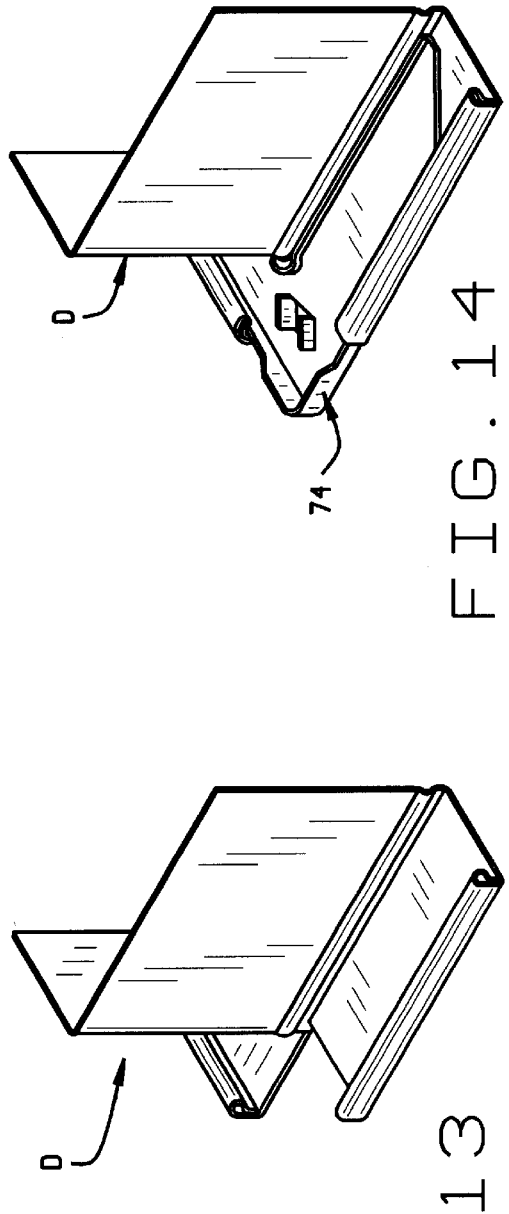

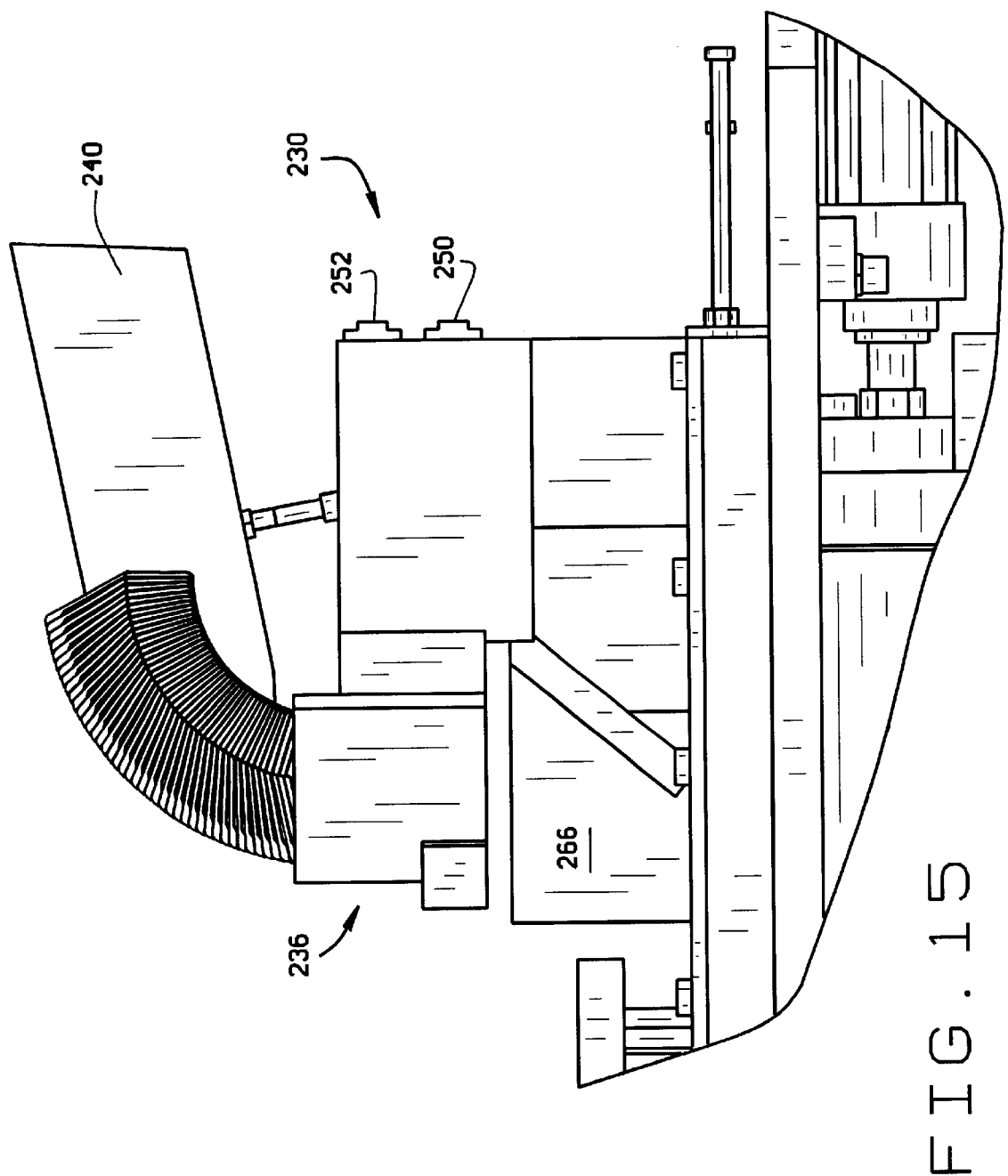

APPARATUS AND METHOD FOR INSERTING ANGLE PLATES IN CHANNEL SHAPED FLANGES OF A DUCT

This application is a continuation of U.S. Pat. No. 6,047,466, filed Feb. 14, 1997 as application Ser. No. 08/801,062.

BACKGROUND OF THE INVENTION

This invention relates to apparatus and methods for inserting an angle plate in channel shaped flanges of a duct.

A typical sheet metal duct section of the type used in heating, ventilating, and air-conditioning systems (HVAC systems) is usually square or rectangular in cross-sectional shape. Such a duct section usually has channel-shaped flanges extending outwardly from its end edges for end-to-end attachment to another duct section. Corner (or angle) plates having first and second legs are inserted into adjacent flanges in a manner so that the first leg is in one flange and the second leg is in the other flange. The flanges are then crimped to secure the angle plates in the flanges. Each angle plate has at least one aperture therethrough. When duct sections are positioned end-to-end, then the angle plate apertures of one duct section align with the angle plate apertures of the other duct section. The aligned apertures are configured for receiving threaded fasteners (e.g., bolts and nuts) to clamp the duct sections together.

Insertion of the angle plates into the flanges is typically performed manually. A technician places the angle plate on the flanges, forces the angle plates into the channel shaped flanges with a hammer or other suitable tool, and then manually crimps the flanges. The primary problems associated with such manual insertion is that this operation is labor intensive and time consuming.

Machines have been used to automatically remove an angle plate from a stack of angle plates and insert it into duct flanges. A problem associated with such machines is that only special types of angle plates can be used with such machines. Conventional angle plates come in a wide variety of shapes and configurations, and most of these angle plates are configured to nest with identical angle plates. The only angle plates which can be used with the prior machines must be shaped so that they do not nest with other angle plates in the stack of angle plates. If the angle plates nest in the stack, the machines are incapable of removing the plates from the stack. Thus, most types of angle plates cannot be used with the machines.

Another problem associated with such machines is that different drive mechanisms are needed to perform the various operations of the machines. For example, a machine might need one drive mechanism for positioning the duct on the machine, another drive mechanism for aligning the angle plate with the flanges, another drive mechanism for pressing the angle plate into the flanges, and another drive mechanism for crimping the flanges. These multiple drive mechanisms complicate the operation of a machine and increase the likelihood of machine failure.

SUMMARY OF THE INVENTION

Among the several objects of the present invention may be noted the provision of improved apparatus and method for inserting angle plates in channel shaped flanges of a duct; the provision of such apparatus and method which minimizes the time and cost necessary to insert angle plates in channel-shaped flanges of ducts; the provision of such apparatus and method for removing an angle plate from a nested stack of angle plates and moving it into alignment with duct flanges; the provision of such apparatus which is capable of using a wide variety of angle plates; the provision of such an apparatus which employs a single actuator to operate a plurality of mechanisms; the provision of such apparatus which maximizes safety and convenience of operation; and the provision of such apparatus which is of relatively simple construction.

Generally, apparatus of the present invention is configured for removing a first angle plate from a stack of angle plates and inserting the first angle plate in channel shaped flanges of a duct. The first angle plate is the bottom-most angle plate of the stack before it is removed from the stack. The stack includes a second angle plate which is the next to bottommost angle plate of the stack before the first angle plate is removed from the stack. The apparatus comprises a duct holding mechanism configured for holding the duct in a fixed position, a separating mechanism, and a plate advancing mechanism. The separating mechanism has at least one support member engageable with the second angle plate in a manner for supporting the second angle plate. The separating mechanism is configured and operable for vertically separating the first and second angle plates from one another. The plate advancing mechanism has a plate engageable member moveable between first and second positions and engageable with the first angle plate after vertical separation of the first and second angle plates for advancing the first angle plate into registration with the flanges of the duct.

In another aspect of the present invention, apparatus for placing an angle plate in channel shaped flanges of a duct comprises a duct holding mechanism, an angle plate advancing mechanism, a press, and a crimper portion. The duct holding mechanism is configured for holding the duct in a fixed position. The angle plate advancing mechanism includes a platen and a plate engageable member. The platen is configured for being adjacent the duct when the duct is held by the duct holding mechanism and configured for slidably supporting an angle plate placed thereon. The plate engageable member is engageable with the angle plate and moveable relative to the platen between first and second positions for sliding the angle plate on the platen and into registration with the flanges of the duct. The platen is moveable relative to the duct holding mechanism between first and second positions. The press has a press member moveable between first and second press positions for releasably pressing the angle plate against the flanges. The crimper portion is engageable with at least one of the flanges of the duct and is fixedly secured to the platen. The crimper portion is configured to crimp the flange(s) upon movement of the platen from its first position to its second position when the duct is held by the duct holding mechanism.

In another aspect of the present invention, apparatus for placing an angle plate in channel shaped flanges of a duct comprises a duct holding mechanism, an angle plate advancing mechanism, a press, and an actuator. The duct holding mechanism is configured for holding the duct in a fixed position. The angle plate advancing mechanism includes a plate engageable member. The plate engageable member is engageable with an angle plate and is moveable relative to the duct holding mechanism between first and second positions for sliding the angle plate into registration with the flanges of the duct. The pres has a press member moveable between first and second press positions. The press member is remote from the flanges when the press member is in its first press position and the duct is held by the duct holding mechanism. The press member is adjacent the flanges when the press member is in its second press position and the duct is held by the duct holding mechanism. The press member is configured to press the angle plate against the flanges upon movement of the press member from its first press position to its second press position when the angle plate is in registration with the flanges of the duct. The plate engageable member is operatively connected to the actuator in a manner so that movement of the actuator effectuates movement of the plate engageable member between its first and second positions. The press member is operatively connected to the actuator in a manner so that movement of the actuator effectuates movement of the press member between its first and second press positions.

In still another aspect of the present invention is a method of removing a first angle plate from a stack of angle plates and inserting the first angle plate in channel shaped flanges of a duct. The first angle plate is the bottom-most angle plate of the stack before it is removed from the stack. The stack includes a second angle plate which is the next to bottom-most angle plate of the stack before the first angle plate is removed from the stack. The method comprises holding the duct in a fixed position, supporting the second angle plate, vertically separating the first and second angle plates from one another, and advancing the first angle plate into registration with the flanges of the duct after vertical separation of the first and second angle plates.

Another aspect of the present invention is a method of placing an angle plate in channel shaped flanges of a duct. The method comprises holding the duct in a fixed position, moving the angle plate into registration with the flanges of the duct, pressing the angle plate against the flanges, and moving a crimping member along a line and into engagement with at least one of the flanges of the duct to crimp the at least one of the flanges in a manner to block removal of the angle plate from the at least one of the flanges.

Other objects and features will be in part apparent and in part pointed out hereinafter.

BRIEF DESCRIPTION OF THE DRAWINGS

FIG. 12 is an enlarged perspective view of the separating mechanism of FIG. 11 showing the lower separator plate moved rearward to release the clamped angle plate and allow it to drop onto the lower separator plate;

FIG. 13 is an enlarged, fragmented perspective view of a corner of a duct before an angle plate is inserted into its flanges;

FIG. 14 is an enlarged, fragmented perspective view of the duct corner of FIG. 13 with an angle plate inserted into its flanges and with the flanges crimped over the angle plate;

FIG. 15 is a side elevational view of another cornering apparatus of the present invention;

Corresponding reference characters indicate corresponding parts throughout the several views of the drawings.

DESCRIPTION OF THE PREFERRED EMBODIMENTS

Figure 1:
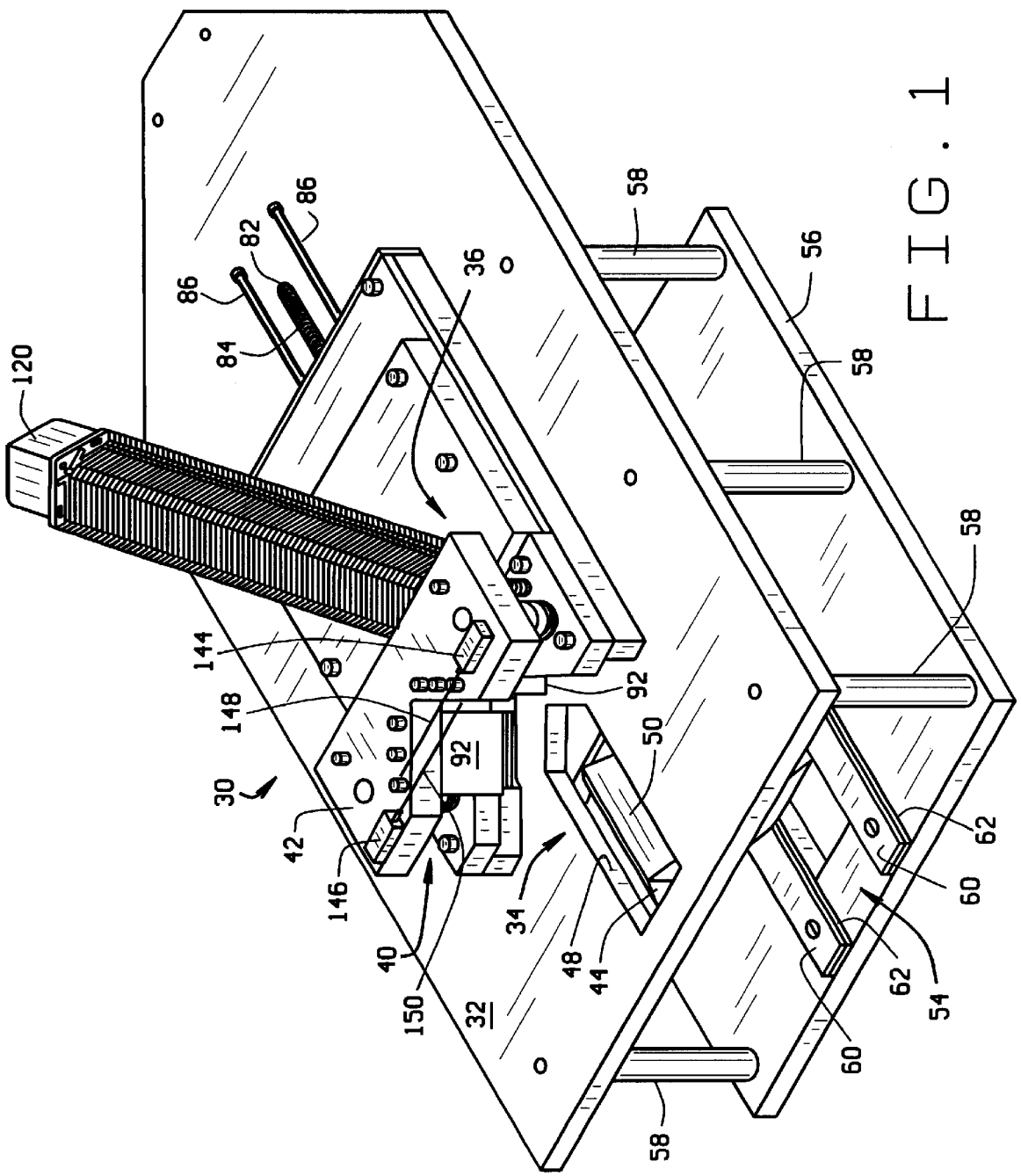
FIG. 1 is a perspective view of a cornering apparatus of the present invention.

Referring now to the drawings, and first more particularly to FIGS. 1–8, cornering apparatus of the present invention is indicated in its entirety by the reference numeral 30. The cornering apparatus 30 is configured for removing a first angle plate from a stack of angle plates (sometimes referred to as corner plates) and inserting the first angle plate in channel-shaped flanges of a duct. The first angle plate is the bottom-most angle plate of the stack before it is removed from the stack. The stack includes a second angle plate which is the next to bottom-most angle plate of the stack before the first angle plate is removed from the stack. The cornering apparatus 30 includes: (1) a generally stationary platform 32; (2) a duct holding mechanism, generally indicated at 34, for holding the duct in a fixed position; (3) a separating mechanism, generally indicated at 36, for vertically separating the first and second angle plates; (4) a plate advancing mechanism, generally indicated at 38, for advancing the first angle plate into registration with the flanges of the duct; and (5) a press mechanism, generally indicated at 40, for pressing the first angle plate into the flanges.

The duct holding mechanism 34 includes an edge receiving plate 42 and a pivotable clamp block 44. The edge receiving plate 42 is mounted on the stationary platform 32 and is shaped and configured for receiving a longitudinal side edge of a duct. As discussed in greater detail below the edge receiving plate 42 is also a part of the press mechanism 40 and is also referred to as a press plate of the press mechanism. The clamp block 44 is also sometimes referred to as a duct pulling block for pulling the duct into position and clamping it in such position. The clamp block 44 (or duct pulling block 44) has a generally horizontal shaft 46 rotatably coupled to the underside of the stationary platform 32 via bearings (not shown) for pivoting movement of the clamp block between a duct release position (FIGS. 1 and 3) and a duct clamping position (FIG. 4). When the clamp block 44 is in its duct release position, the clamp block is positioned entirely below the stationary platform 32. When the clamp block 44 is pivoted upward to its duct clamping position, the clamp block extends upwardly through an opening 48 in the stationary platform 32 and a duct-engaging surface 50 of the clamp block is generally adjacent the edge receiving plate 42. Preferably, the shaft 46 of the clamp block 44 is offset from the clamp block's center of gravity in a manner so that gravity biases the clamp block in its duct release position.

Figure 3:
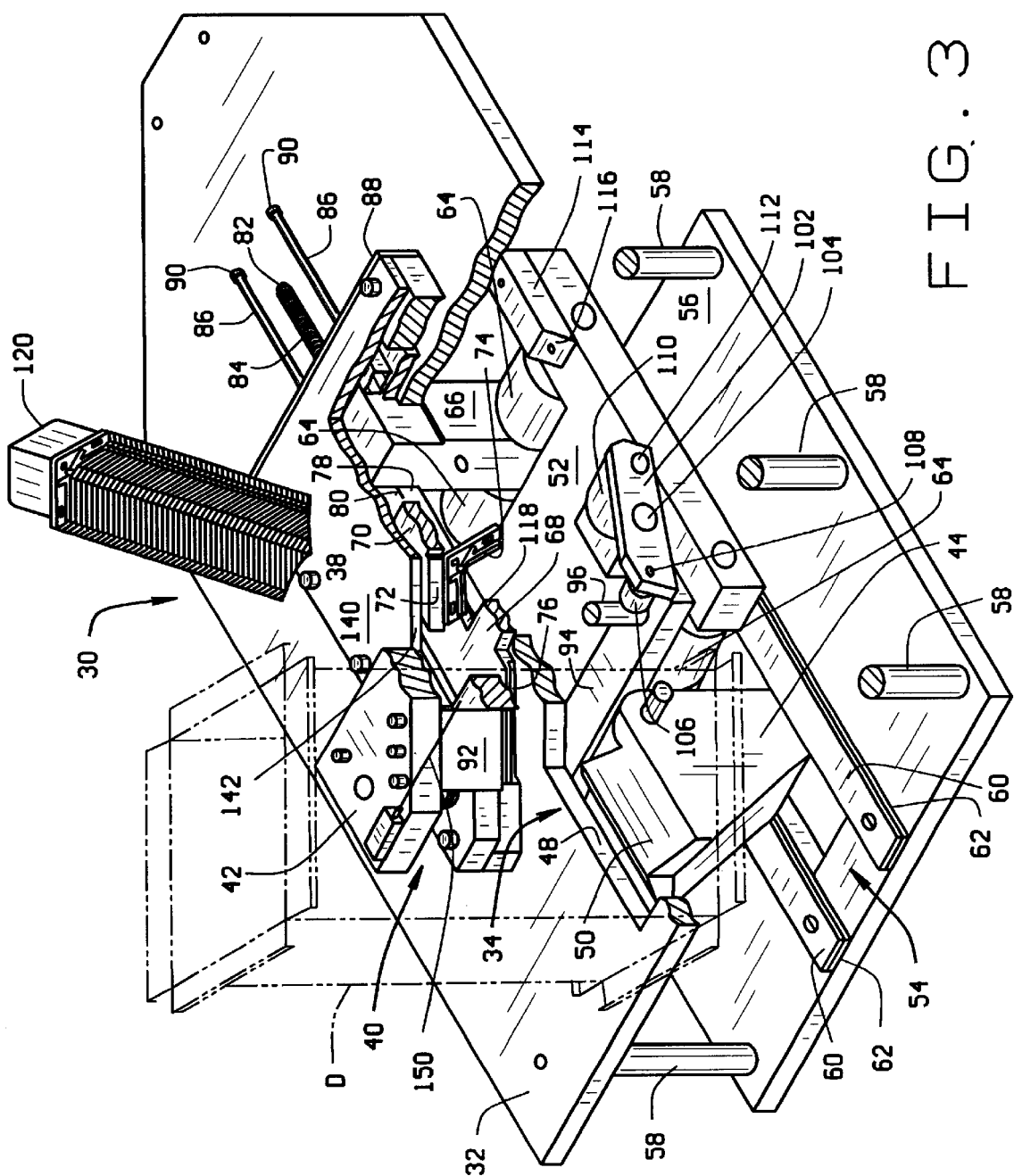
FIG. 3 is a perspective view of the cornering apparatus of FIG. 1 with portions broken away to show detail and with a duct shown in phantom, the cornering apparatus being shown in an initial position.
Figure 4:
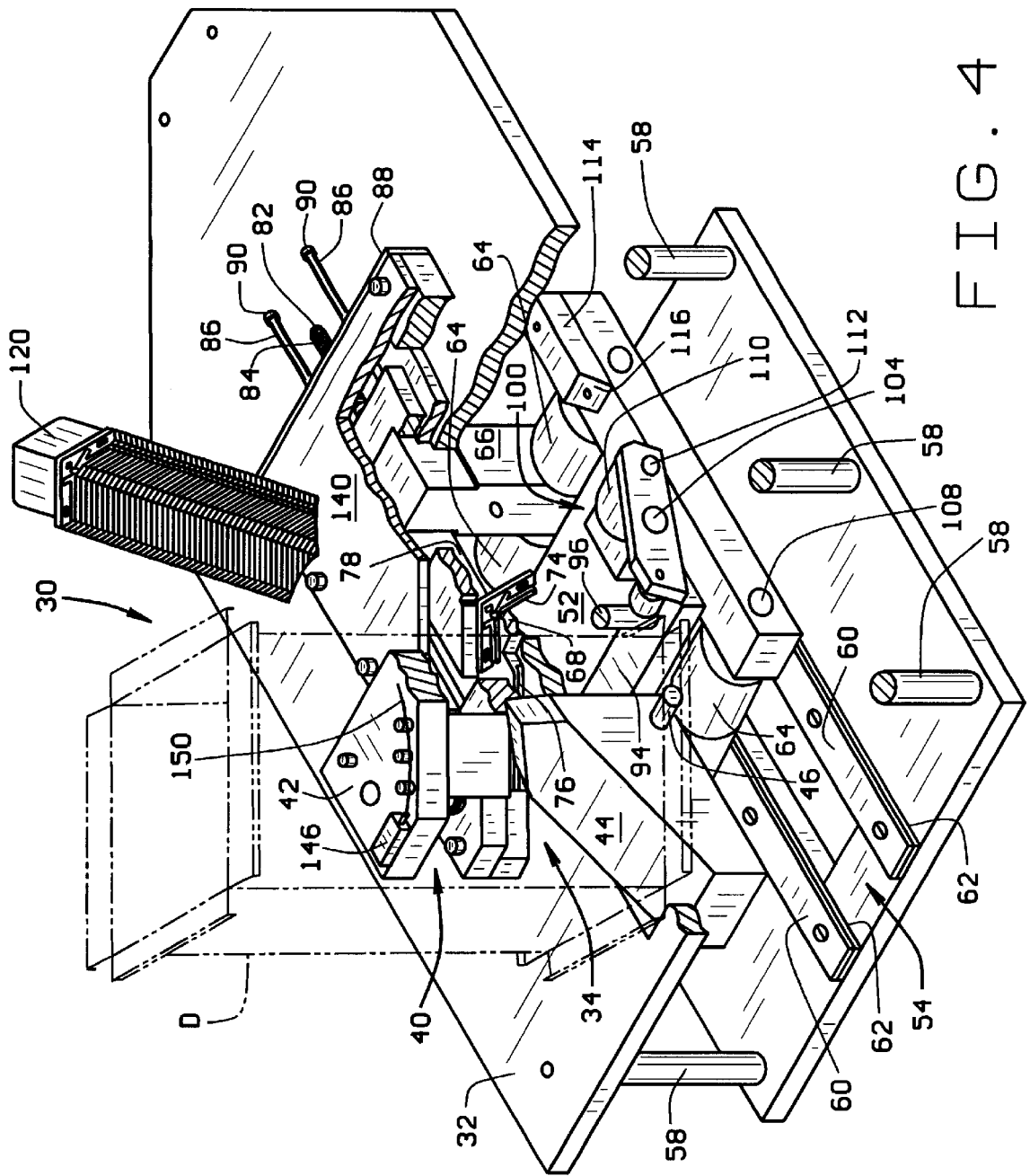
FIG. 4 is a perspective view similar to that of FIG. 3 but showing the cornering apparatus in a position in which a duct holding mechanism of the cornering apparatus holds a duct prior to insertion of an angle plate into flanges of the duct.
Figure 5:
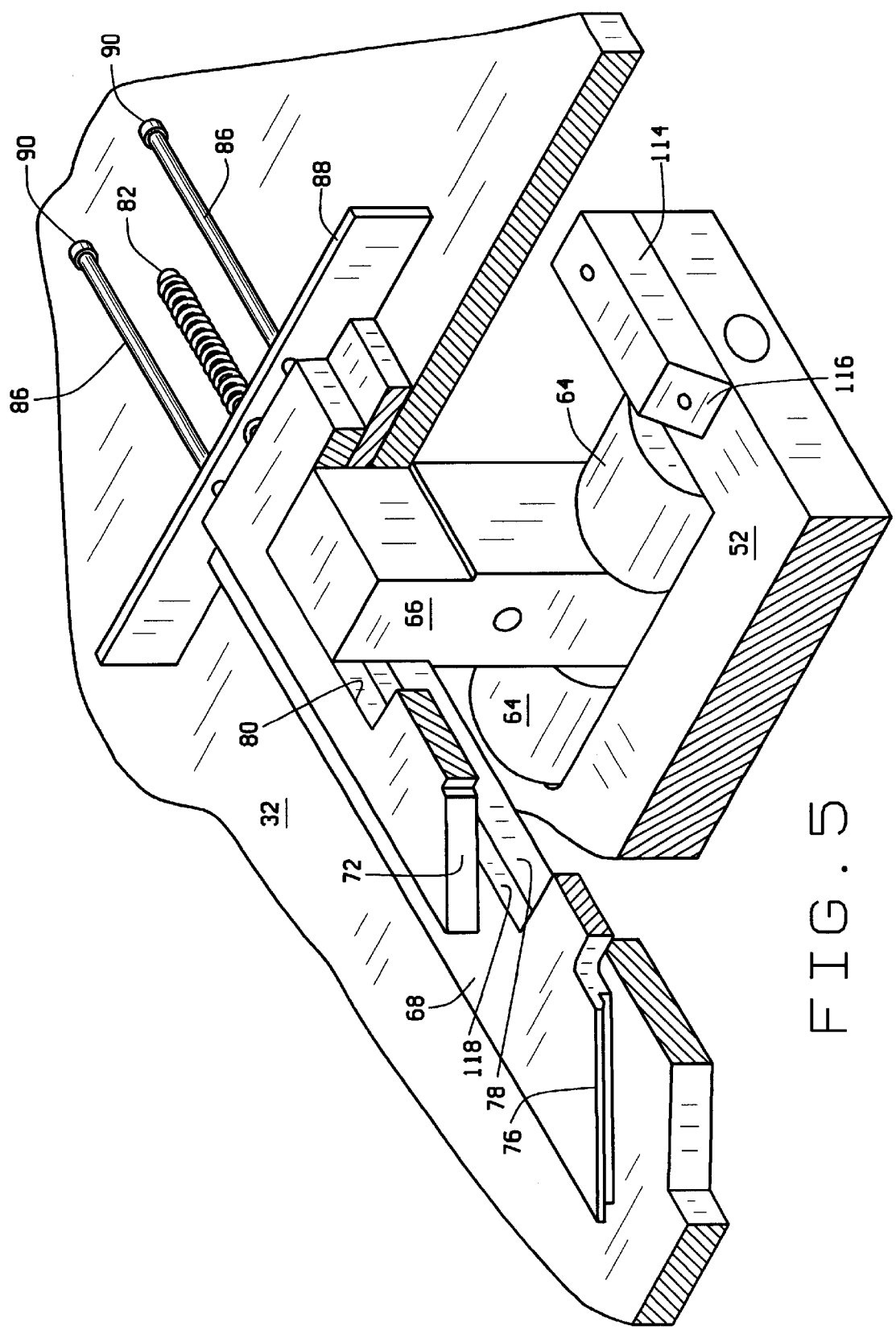
FIG. 5 is an enlarged, fragmented perspective view of a carriage, carriage drive arm, pusher plate, and crimping plate of the cornering apparatus of FIG. 1.

An exemplary duct D is shown in phantom in FIGS. 3 and 4. To secure the duct D on the cornering apparatus 30, the duct is placed in a generally vertical orientation on the cornering apparatus when the clamp block 44 is in its duct release position (FIG. 3). In this orientation, the flanges of one end of the duct D engage the stationary platform 32 and circumscribe the opening 48 and a longitudinal edge of the duct is adjacent the edge receiving plate. The clamp block 44 is then pivoted upward to its duct clamping position where the duct-engaging surface 50 of the clamp block 44 engages the inside of the duct D to press the duct against the edge receiving plate 42. Thus, the duct holding mechanism 34 secures the duct D to the cornering apparatus 30 in a manner so that the duct is positioned to receive an angle plate.

The clamp block 44 is moved from its duct release position (FIG. 3) to its duct clamping position (FIG. 4) by a carriage, generally indicated at 52. The carriage 52 rides in a track 54 fixed to a lower plate 56. The lower plate 56 is spaced below the stationary platform 32 and secured thereto via a plurality of spacer columns 58. The track 54 comprises a spaced pair of elongate guide rails 60 and a pair of elastomeric strips 62 positioned between the rails and lower plate 56. A plurality of rollers 64 are rotatably mounted to the carriage 52 on opposite sides of one of the guide rails 60 for forward and rearward linear movement of the carriage along the rails. The carriage 52 is moved along the rails 60 by a linear actuator 65 (FIG. 2) operatively connected at one end to a drive arm 66 of the carriage, and operatively connected at an opposite end to the stationary platform 32. The linear actuator 65 is preferably a hydraulic cylinder, but may be of any other type of linear actuator without departing from the scope of this invention. Forward movement of the carriage 52 from the position shown in FIG. 3 to the position shown in FIG. 4 causes one of the forward rollers 64 to push against a rearwardly facing surface of the clamp block 44 thereby to rotate the clamp block up to its clamping position.

The cornering apparatus further comprises a crimping member (or plate) 68 which is configured to slide on the stationary platform 32. An angle plate is dropped from the stack of angle plates onto the crimping plate 68 via the separating mechanism 36, and is pushed along the top surface of the crimping plate and into the flanges of the duct D via the plate advancing mechanism 38. The plate advancing mechanism 38 is described herein before the description of the separating mechanism 36 because the plate advancing mechanism operates immediately after clamping of the duct D by the duct holding mechanism 34. The separating mechanism 36 is described in detail below.

The plate advancing mechanism 38 comprises a pusher plate 70. The pusher plate 70 is slidable on the crimping plate 68 and the crimping plate is slidable on the stationary platform 32. The pusher plate 70 has a pushing surface 72 at its forward end which is engageable with an angle plate, indicated at 74 in FIGS. 3 and 4, to push the angle plate toward the duct flanges upon forward movement of the pusher plate relative to the crimping plate 68. The crimping plate 68 has a crimping surface 76 at its forward end engageable with the flanges of the duct D to crimp the flanges. Immediately after clamping of the duct D via the duct holding mechanism 34, the crimping surface 76 of the crimping plate 68 is positioned in abutting relationship to and rearward of the duct flanges, and the pushing surface 72 of the pusher plate 70 is rearwardly spaced from the crimping surface. Preferably, the upper surface of the crimping plate 68 is at an elevation at least as high as the upper edges of the flanges when the duct D is held by the duct holding mechanism 34 so that the angle plate slides over such upper edges and into the channels formed by the flanges.

The drive arm 66 of the carriage 52 extends upward through an opening 78 in the stationary platform 32 and is engageable with the pusher plate 70 and crimping plate 68 upon forward and rearward movement of the drive arm. The opening 78 in the stationary platform 32 is sufficiently large so that the drive arm 66 does not engage the stationary platform as the drive arm is moved by the linear actuator 65. The pusher plate 70 includes a slot 80 for accommodating the upwardly extending drive arm 66. The pusher plate 70 is coupled to the drive arm via a rod 82 and a compression spring 84. The rod 82 is fixed to the drive arm 66 and extends rearwardly through a horizontal bore (not shown) in the pusher plate 70. The compression spring 84 surrounds the rod 82 and has a forward end engaging a rearward face of the pusher plate 70 and a rearward end engaging a head at the rearward end of the rod. Because of the rod 82 and spring 84, forward and rearward movement of the drive arm 66 causes forward and rearward movement of the pusher plate. A pair of limit rods 86 extend rearwardly from and are fixed to the pusher plate 70. The limit rods 86 extend through bores in a stationary back plate 88 (FIG. 5) which is secured to the stationary platform 32. The limit rods 86 include heads 90 at their rearward ends which are engageable with the stationary back plate 88 to limit forward movement of the pusher plate 70. Movement of the drive arm 66 causes movement of the pusher plate 70 between a rearward position (shown in FIG. 3) and a forward position (shown in FIG. 7). When the pusher plate 70 is in its rearward position, the rearward end of the pusher plate is adjacent the stationary back plate 88. When the pusher plate 70 is in its forward position, the pushing surface 72 of the pusher plate is positioned over the duct flanges of the duct D and the heads 90 of the limit rods 86 engage the stationary back plate 88. Movement of the pusher plate 70 from its rearward position to its forward position causes the pusher plate 70 to push the angle plate 74 along the upper surface of the crimping plate 68 and into the registration with the channel shaped flanges of the duct D. The upper surface of the crimping plate constitutes a platen configured for supporting the angle plate 74 as the angle plate is advanced by the pusher plate 70 into registration with the duct flanges. After the pusher plate 70 has reached its forward position, subsequent forward movement of the drive arm 66 causes compression of the compression spring 84 but the limit rods 86 and heads 90 prevent further forward movement of the pusher plate.

Figure 6:
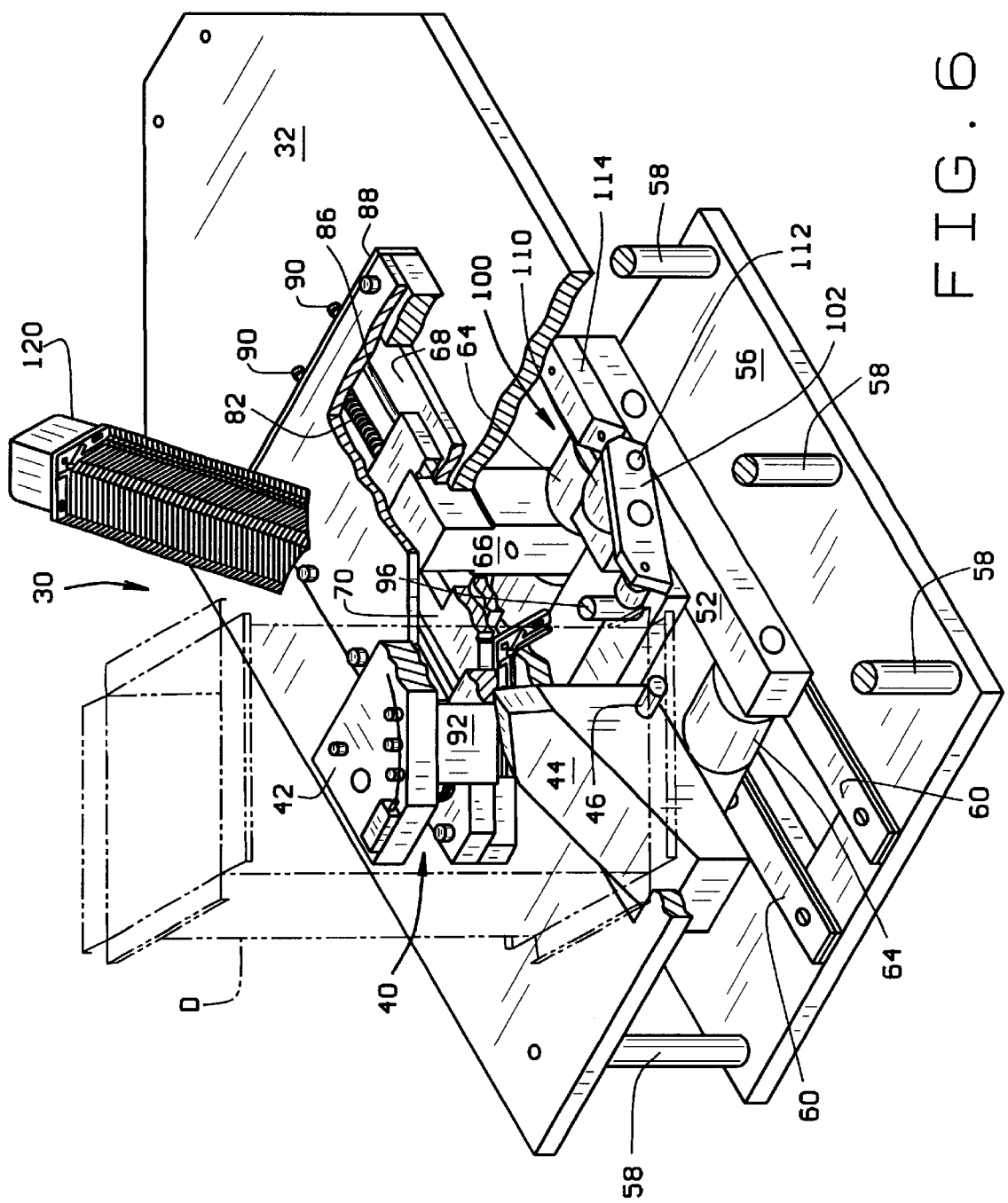
FIG. 6 is a perspective view similar to that of FIG. 4 but showing the carriage and pusher plate moved forward to a position in which an angle plate is pushed into vertical alignment with the flanges of the duct.
Figure 7:
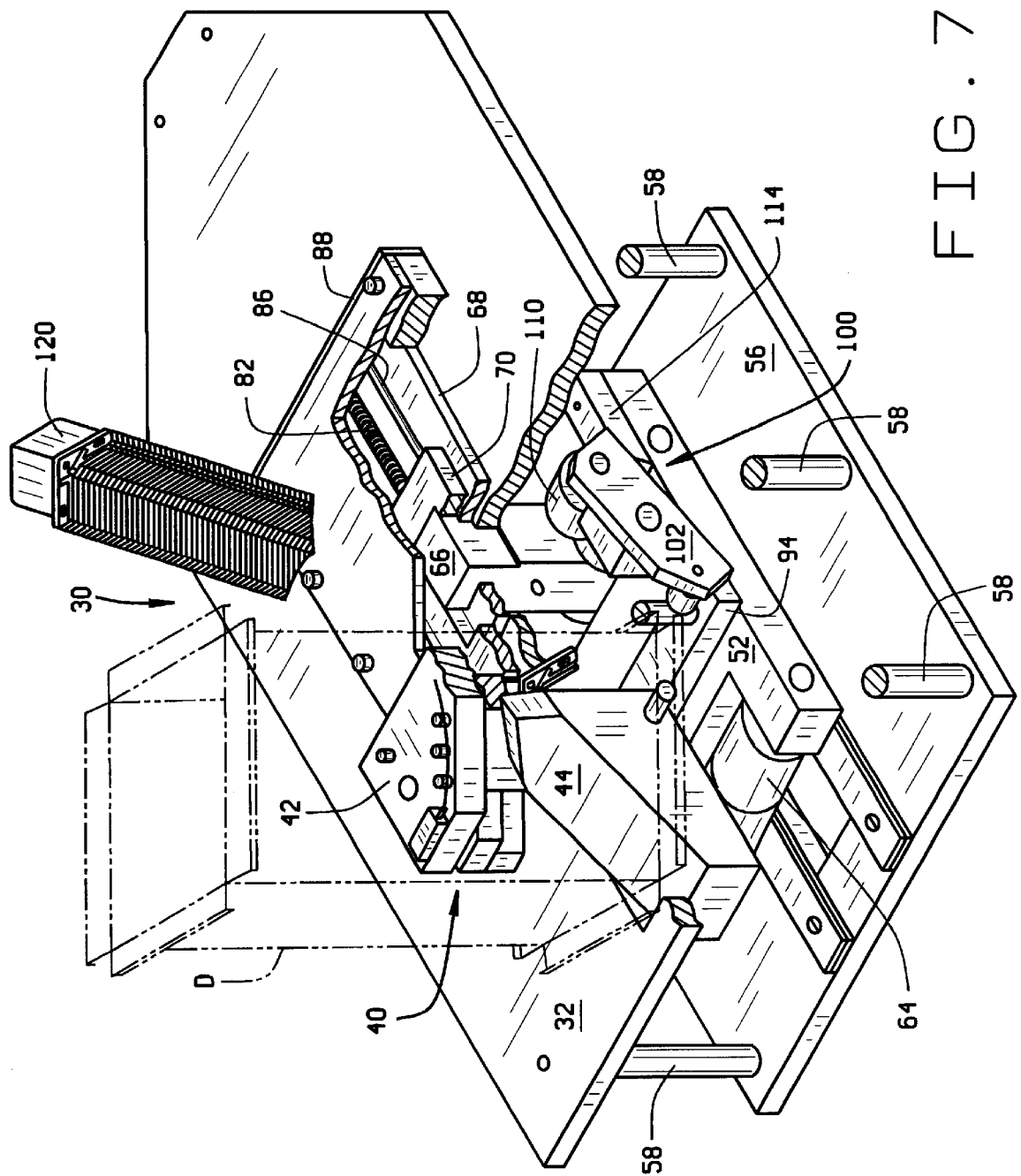
FIG. 7 is a perspective view similar to that of FIG. 6 but showing the carriage moved forward to a position to cause a press mechanism of the cornering apparatus to press the angle plate downward into the flanges.

The press mechanism 40 includes the press plate 42 and two press blocks 92 fixed to and depending from the press plate 42. The press plate 42 and press blocks 92 are mounted on the stationary platform 32 via guide rods (not shown) for up and down movement relative to the platform between a raised position (FIG. 6) and a lowered position (FIG. 7). Preferably, the guide mechanism includes springs (not shown) for biasing the press plate 42 in its raised position. After the angle plate 74 is moved into the flanges of the duct D, the press plate 42 is moved from its raised position to its lowered position to press the angle plate into the flanges. A transverse connecting bar 94 is positioned below the stationary platform 32 and is connected to the press plate 42 via a plurality of vertical connecting rods 96. Because of the connecting rods 96, up and down movement of the connecting bar 94 causes up and down movement of the press plate 42.

The transverse connecting bar 94 is preferably moved up and down by a cam mechanism, generally indicated at 100. The cam mechanism 100 includes a lever 102 pivotally connected at 104 to a bracket fixed to the underside of the stationary platform 32. The cam mechanism 100 further includes a small roller 106 rotatably connected at 108 to the lever 102, a large roller 110 rotatably connected at 112 to the lever, and a ramp block 114 secured to a rear region of the carriage 52. The small roller 106 engages the top surface of the transverse connecting bar 94, and the large roller 110 engages the carriage 52 and is engageable with the ramp block 114. As the carriage 52 is moved forward from the position shown in FIG. 3 to the position shown in FIG. 6, the large roller 110 is engaged by and rotated by the carriage. Further forward movement of the carriage 52 causes a sloped camming surface 116 of the ramp block 114 to move the large roller 110 upward. This upward movement of the large roller 110 causes the lever 102 to turn in a counter-clockwise direction as shown in FIGS. 6 and 7 to thereby cause the small roller 106 to push the transverse connecting bar 94 and press plate 42 downward to their lowered position.

The crimping plate 68 includes a slot 118 sized for accommodating the drive arm 66. Preferably, the slot 118 is sufficiently long so that the drive arm 66 is moved from its rearward-most position as shown in FIG. 3 to the position shown in FIG. 7 before the drive arm engages the crimping plate 68. Forward movement of the drive arm 66 from the position shown in FIG. 7 to the position shown in FIG. 8 causes it to push the crimping plate 68 forward and into engagement with the flanges of the duct D. Preferably, the crimping surface 76 of the crimping plate 68 is shaped and configured to crimp (or bend) upstanding portions of the duct flanges forward and over angle plate 74 to retain the angle plate in the flanges.

Referring now to FIGS. 2 and 9–12, the separating mechanism 36 is positioned generally over the crimping plate 68 and pusher plate 70. An angle plate guide (or magazine) 120 (FIG. 2) extends upward from the separating mechanism 36 and is preferably rearwardly slanted. The separating mechanism 36 and angle plate guide 120 support a stack of angle plates awaiting to be fed downwardly to the plate advancing mechanism 38. The stack of angle plates may be a nested or an un-nested stack of angle plates. The separating mechanism 36 comprises a lower separator plate 122, an upper separator plate 124, and a stationary separator block 126. The lower separator plate 122 is secured to and spaced above crimping plate 68 via a plurality of threaded fasteners 128 (only the heads of which are shown in FIGS. 9–12). The fasteners 128 cause the lower separator plate 122 to move with the crimping plate 68. The stationary separator block 126 is operatively connected to the stationary platform 32. Thus, the lower separator plate 122 moves relative to the stationary separator block 126. The upper separator plate 124 is movably coupled to the lower separator plate 122 via a pair of compression springs 130. The compression springs 130 are connected at their forward ends to the upper separator plate 124 and are connected at their rearward ends to a bar 132 fixed to the lower separator plate 122. The lower separator plate 122 includes a window 134 sized and shaped for passage of an angle plate.

Figures 9, 10:
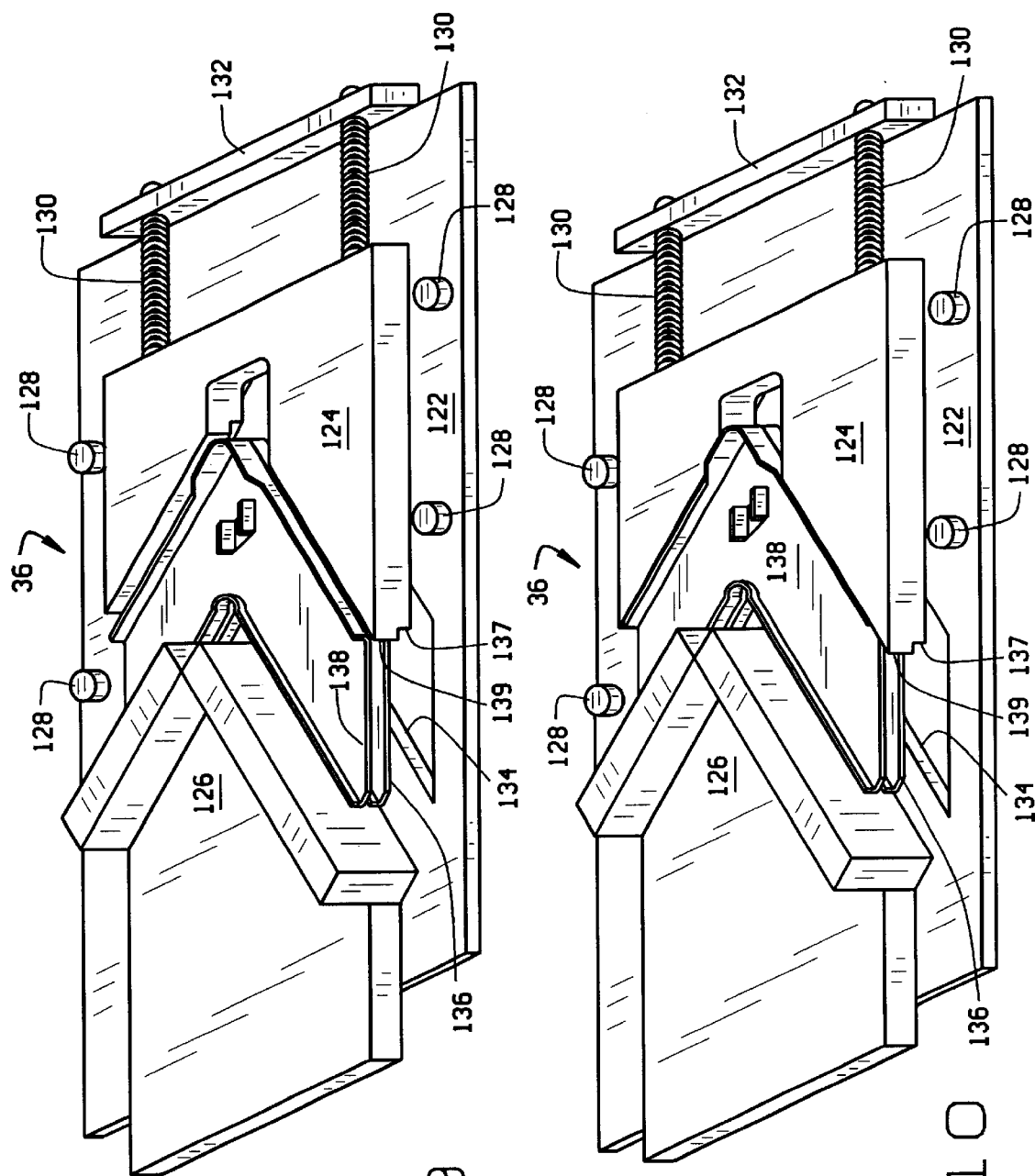
FIG. 9 is an enlarged perspective view of a separating mechanism of the cornering apparatus of FIG. 1, the separating mechanism being in a position in which a lower separator plate of the separating mechanism supports a stack of angle plates and an upper separator plate is spaced rearwardly of the angle plates.
FIG. 10 is an enlarged perspective view of the separating mechanism of FIG. 9 showing the second to bottom-most angle plate of the stack being squeezed between the upper angle plate and a stationary separator block.

Initially as shown in FIG. 9 (i.e., before the drive arm 66 initiates forward movement of the crimping plate 68 and lower separator plate 122), the stack of angle plates rests on and is supported by a portion of the lower separator plate which is forward of the window 134. In this position, the upper separator plate 124 is spaced from the angle plates. Although only two angle plates are shown in FIG. 9, it is to be understood that these angle plates represent only the two bottom-most angle plates in the stack of angle plates and that the stack actually includes a significantly larger number of angle plates. For purposes of discussion, the bottom-most angle plate shown in FIG. 9 constitutes a first angle plate 136 and the next to bottom-most angle plate constitutes a second angle plate 138. Preferably, the forward end of the upper separator plate 124 is generally V-shaped for simultaneously engaging both legs of an angle plate. As the drive arm 66 pushes the crimping plate 68 and lower separator plate 122 forward, the compression springs 130 push the upper separator plate 124 forward toward the stationary separator block 126 and against the second angle plate 138. As shown in FIG. 10, this forward movement of the separator plate 122 causes the second angle plate 138 to be pressed between the stationary separator block 126 and upper separator plate 124 in a manner to support the second angle plate. Also preferably, the upper separator plate 124 is of a stepped configuration so that the forward lower edge 137 of the upper separator plate 124 is rearward of the forward upper edge 139. Because of this stepped configuration, the forward end of the upper separator plate 124 engages the second angle plate 138 (i.e., the next to bottom-most angle plate in the stack) but is spaced from the first angle plate 136 (i.e., the bottom-most angle plate in the stack) so that the first angle plate is not clamped between or otherwise supported by the upper separator plate and stationary separator block.

As shown in FIG. 10, the first angle plate 136 is supported in a lower angle plate position by the lower separator plate 122 and the second angle plate 138 is supported in a second angle plate position by the upper separator plate 124 and the stationary separator block 126. Further forward movement of the lower separator plate 122 causes the window 134 of the lower separator plate to align with the first angle plate 136. When the window 134 is moved into alignment (or registration) with the first angle plate 136 as shown in FIG. 11, the first angle plate falls through the window and onto the upper surface of the pusher plate 70.

The lower separator plate 122 constitutes a first support member of the separating mechanism 36 moveable between a support position and a release position. The lower separator plate 122 is in its support position to support the stack of angle plates when the window 134 is rearwardly spaced from the stationary separator block 126, and is in its release position when the window is adjacent the stationary separator block and in registration with the first angle plate 136. The upper separator plate 124 constitutes a second support member (or a moveable clamping member) of the separating mechanism 36 and is moveable between a supporting position and a release position. In its supporting position, the upper separator plate 124 presses the second angle plate 138 against the stationary separator block 126. In its release position, the upper separator plate 124 is spaced sufficiently from the separator block 126 to allow the second angle plate 138 to move downward. Thus, the separating mechanism 36 is configured and operable for separating the first and second angle plates.

Figure 11:
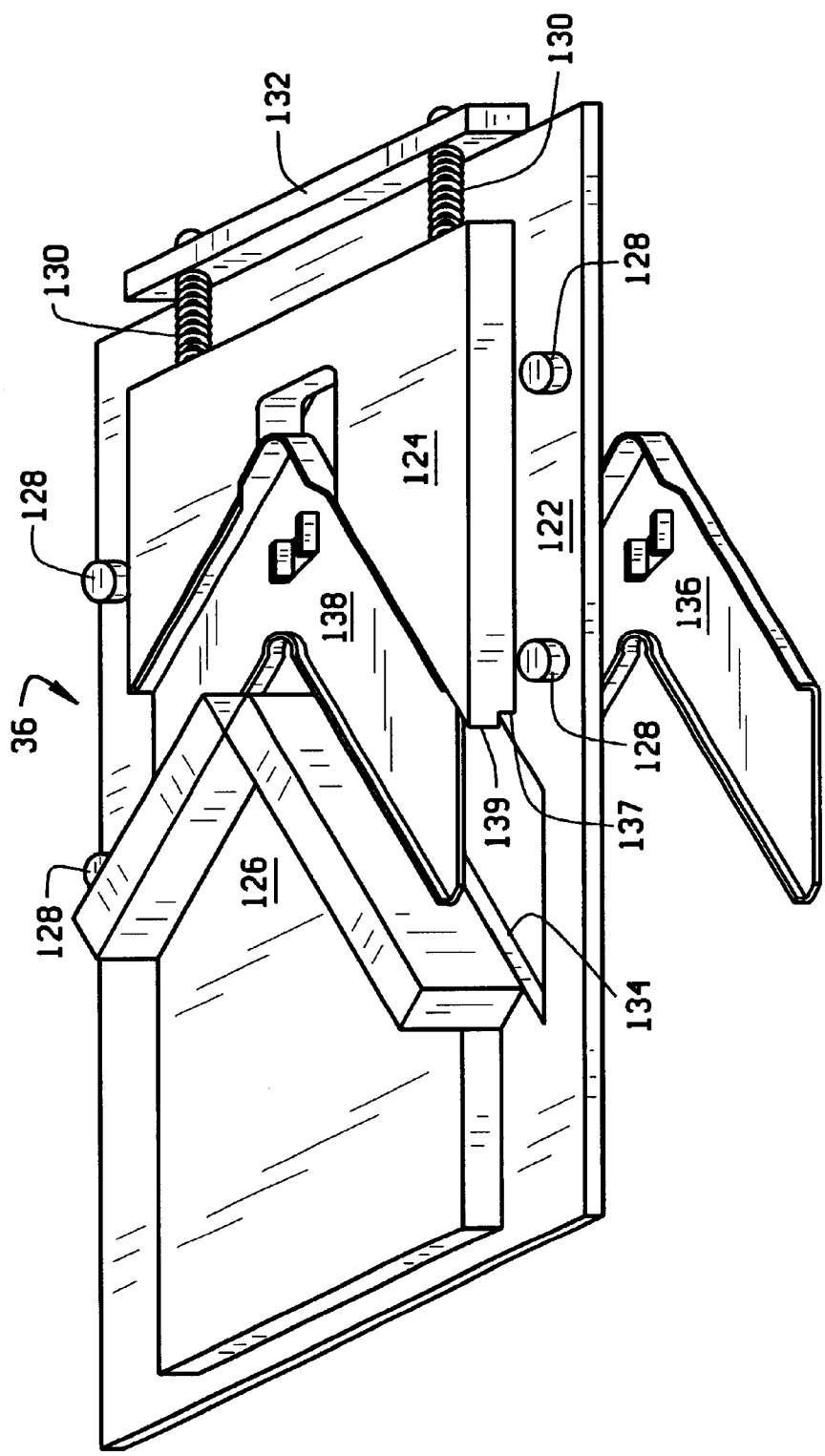
FIG. 11 is an enlarged perspective view of the separating mechanism of FIG. 10 showing the lower separator plate moved forward to a position in which a window of the lower separator plate aligns with the lower-most angle plate of the stack.

Because the upper separator plate 124 is connected to the lower separator plate 122 by the compression springs 130, the springs compress but the distance between the upper separator plate and the stationary separator block 126 remains constant as the lower separator plate is moved from the position shown in FIG. 10 to the position shown in FIG. 11. Preferably, the position of the lower separator plate 122 shown in FIG. 11 corresponds the positions of the crimping plate 68 and pusher plate 70 shown in FIG. 8. Thus, the first angle plate 136 is dropped onto the upper surface of the pusher plate 70 and rearward of the duct D as the flanges of the duct are being crimped to retain another angle plate in the flanges. When the drive arm 66 moves the crimping plate 68 and pusher plate 70 rearward to their rearward-most positions shown in FIG. 3, the lower separator plate 122 is moved rearward from the position shown in FIG. 11 to the position shown in FIG. 12. As the lower separator plate 122 is moved rearward, the window 134 moves rearward and out of alignment with the second angle plate 138 and the upper separator plate 124 moves rearward to release the clamping force on the second angle plate. This causes all of the angle plates of the stack to move downwardly to a position in which the second angle plate 138 rests on the lower separator plate 122. Thus, the lower separator plate 122 supports the entire stack of angle plates and the second angle plate 138 is the bottom-most angle plate of the stack.

Preferably, a stationary cover plate 140 secured to the stationary platform 32 is positioned over the pusher plate 68 so that the pusher plate slides under the cover plate as the drive arm 66 pushes the crimping plate 68 and pusher plate rearward to their initial positions as shown in FIG. 3. The stationary cover plate 140 includes a forward edge 142 (FIG. 3) which substantially aligns with the forward pushing surface 72 of the pusher plate 70 when the pusher plate is in its rearward-most position. The forward edge 142 of the stationary cover plate 140 engages the first angle plate 136 as the pusher plate 70 is returned to its rearward-most position. This forward edge 142 prevents further rearward movement of the first angle plate 136 so that the pusher plate 70 slides out from under the first angle plate thereby causing the first angle plate to fall onto the crimping plate 68 and immediately forward of the pusher plate. Thus, the first angle plate 136 is now in position to be pushed forward into alignment with the flanges of a duct.

Referring again to FIG. 1, a cycle switch 144 and a reset switch 146 (FIG. 1) are preferably positioned on the edge receiving plate 42. The cycle switch 144 includes a resilient actuation wire 148 extending laterally across a duct receiving recess of the edge receiving plate 42. The reset switch 146 includes a resilient actuation wire 150 extending laterally across the duct receiving recess and forward of the actuation wire 148 of the cycle switch. The cycle switch 144 is configured to activate the linear actuator 65 when the actuation wire 148 is moved by the duct D. After the linear actuator 65 completes a cycle, the reset switch 146 prevents the linear actuator 65 from being activated again until the actuation wire 150 of the reset switch is released and then pressed again.

In operation, the pusher plate 70 and crimping plate 68 are initially in their rearward-most positions (FIG. 3), the angle plate 74 is positioned on the top surface of the crimping plate and immediately forward of the pusher plate, and the pivotable clamp block 44 is in its duct release position. The duct D is placed on the stationary platform 32 by an operator and pushed rearwardly toward the edge receiving plate 42. When the duct D is pushed against the actuation wires 148, 150 of the cycle and reset switches 144, 146, the linear actuator 65 is activated to push the drive arm 66 and carriage 52 forward to the position shown in FIG. 4 to thereby pivot the pulling block/clamp block 44 to its duct clamping position. The pivoting of the pulling block/clamp block 44 causes the duct D to be pulled rearwardly to a position in which the flanges of the duct are under the press blocks 92 and the edges of the duct are adjacent the forward end of the clamping plate 68. The pulling block/clamp block 44 clamps the duct in this position. The linear actuator 65 continues to push the drive arm 66 and carriage 52 forward to the position shown in FIG. 6. Forward movement of the drive arm 66 to the position shown in FIG. 6 causes the pusher plate 70 to push the angle plate 74 into vertical alignment with the flanges of the duct D. The pusher plate 70 constitutes a plate engageable member of the plate advancing mechanism 38 for advancing an angle plate into registration with the flanges of the duct. The linear actuator 65 then continues to push the drive arm 66 and carriage 52 forward to the position shown in FIG. 7. Forward movement of the carriage 52 to the position shown in FIG. 7 causes the ramped block 114 to rotate the lever 102 in a counter-clockwise direction to thereby downwardly move the press plate 42. The downward movement of the press plate 42 causes the press blocks 92 to press the angle plate 74 into the channel-shaped flanges of the duct D. The linear actuator 65 then continues to push the drive arm 66 and carriage 52 forward to the position shown in FIG. 8. Forward movement of the drive arm 66 to the position shown in FIG. 8 causes the crimping plate 68 to move forward against the duct flanges to crimp the flanges and thereby lock the angle plate 74 in the flanges. FIG. 13 shows a corner of the duct D before an angle plate is inserted into its flanges and FIG. 14 shows the corner after insertion of the angle plate 74 and after the flanges of the duct have been crimped over the angle plate. The crimping plate 68 is preferably configured to crimp a substantial length of each flange, and is more preferably configured to crimp the flange so that the portion of the angle plate's outer edge which is adjacent the flange is overlaid completely with the flange as shown in FIG. 14.

The forward movement of the crimping plate 68 also causes the lower separator plate 122 of the separating mechanism 36 to move forward to the positions shown in FIG. 10 and FIG. 11 so that the second angle plate 138 is clamped between the upper separator plate 124 and the stationary separator block 126 and so that the window 134 is brought into alignment with the first angle plate 136. When the window 134 aligns with the first angle plate 136, the first angle plate drops through the window and onto the pusher plate 70.

Figure 2:
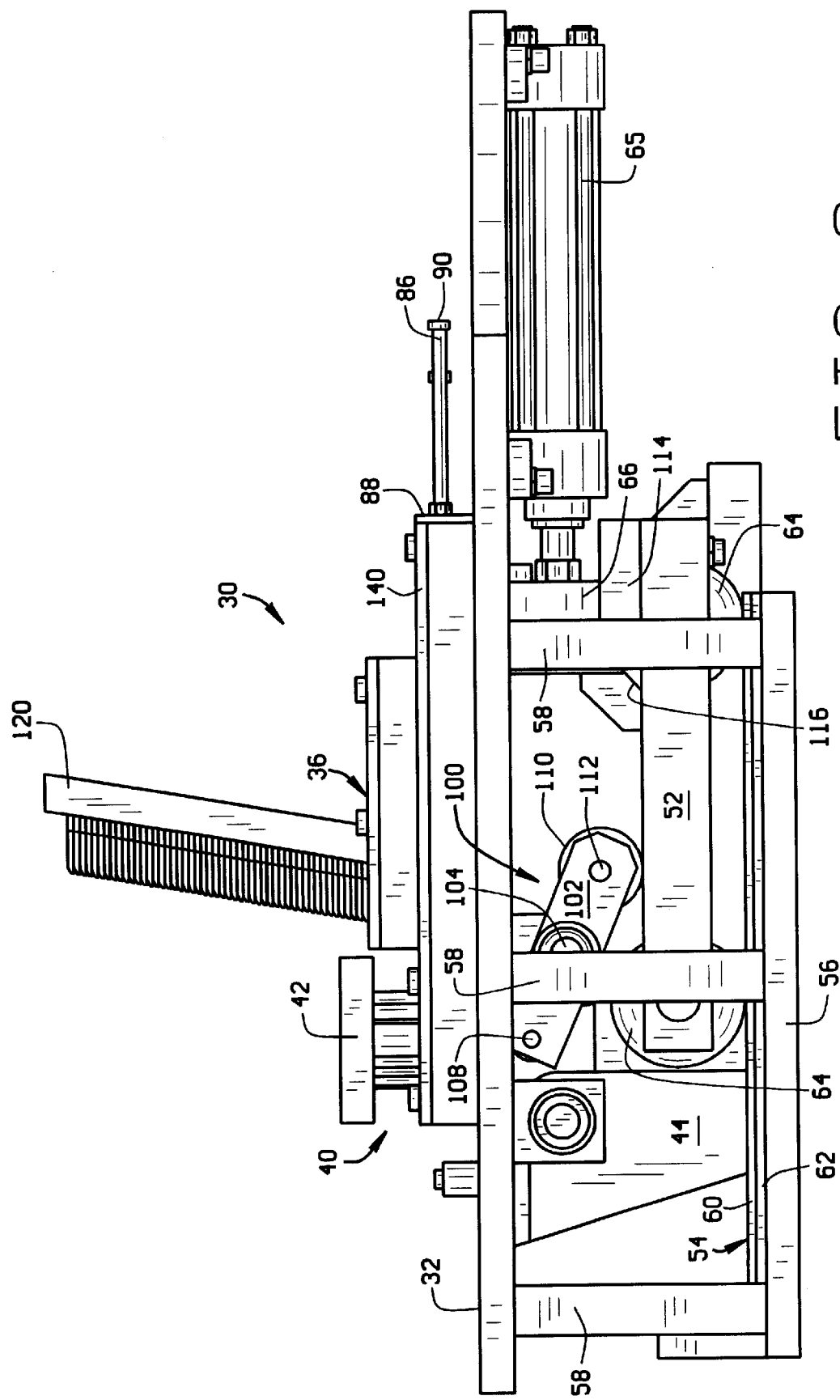
FIG. 2 is a side elevational view of the cornering apparatus of FIG. 1.
Figure 8:
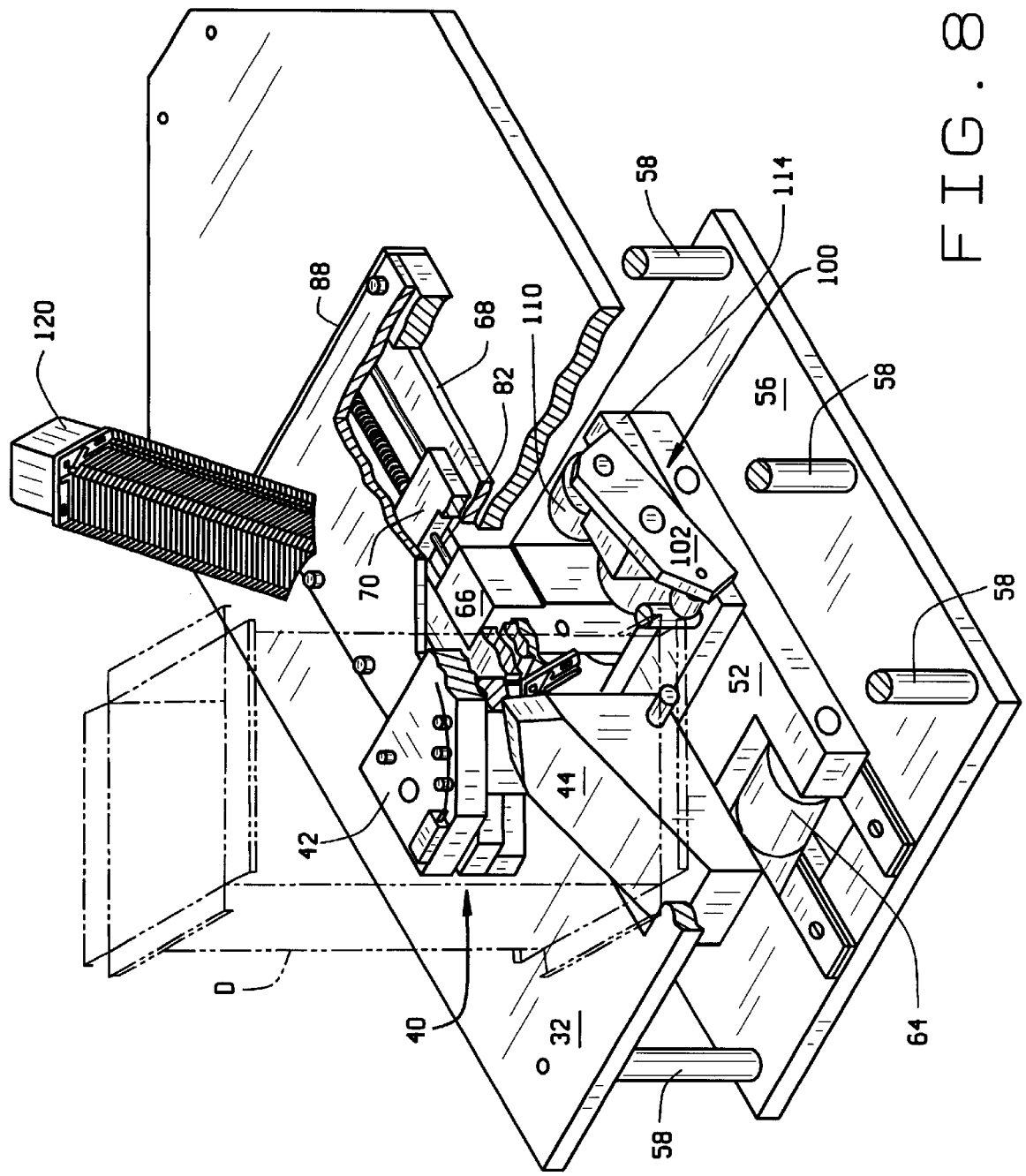
FIG. 8 is a perspective view similar to that of FIG. 7 but showing the carriage drive arm moved forward to a position to cause the crimping plate to crimp the flanges of the duct to thereby retain the angle plate in the flanges.

As the carriage 52 is moved to its forward-most position as shown in FIG. 8, it hits a switch (not shown) which causes the linear actuator 65 to return the carriage, pusher plate 70, and crimper plate 68 to their rearward-most positions as shown in FIGS. 2 and 3. The first angle plate 136, which at this time is resting on the top surface of the pusher plate 70, moves rearwardly with the pusher plate until it engages the forward edge 142 of the stationary cover plate 140 and is pushed off the forward edge of the pusher plate and onto the crimping plate 68. The rearward movement of the crimping plate 68 also causes the second angle plate 138 to move downward onto the lower separator plate 122, causes the press mechanism 40 to move to its raised position, and causes the clamp block 44 to move to its duct release position. The duct may then be rotated ninety degrees and positioned on the stationary platform 32 to enable the cornering apparatus 30 to insert the first angle plate 136 into another corner of the duct. Alternatively, the duct may be removed from the platform and a second duct positioned on the platform so that the cornering apparatus 30 may insert the first angle plate into the flanges of such second duct. Because the linear actuator 65 cannot be energized again until after the resilient actuation wire 150 of the reset switch 146 is released and then flexed again, the duct D must be moved away from the edge receiving plate 42 before another angle plate can be inserted. This minimizes the risk that another angle plate will be advanced to the duct D before the duct is withdrawn from the cornering apparatus 30.

The cornering apparatus 30 is thus configured for removing the bottom-most angle plate from a stack of angle plates and inserting such plate into the flanges of a duct. It is to be understood that a wide variety of angle plates (both nestable and non-nestable) may be used with the cornering apparatus 30 without departing from the scope of this invention.

Referring now to FIG. 15, a second embodiment of a cornering apparatus of the present invention is indicated in its entirety by the reference numeral 230. The cornering apparatus 230 is identical to the cornering apparatus 30 of FIGS. 1 and 2, except the cornering apparatus 230 includes a separating mechanism 236 which is different than the separating mechanism 36. In this embodiment, the separating mechanism 236 is operated by linear actuators independent of the actuator that operates the duct holding mechanism, plate advancing mechanism, press mechanism, and crimping mechanism. Also, the cornering apparatus 230 of this embodiment is configured for holding a stack of angle plates which are in an upside-down orientation. Thus, a dispensed angle plate must be inverted (i.e., flipped) before being placed on the upper surface of the crimping plate. Also, because of the shape of the angle plates shown in FIG. 15, the stack assumes an arcuate shape. To accommodate such an arcuate shaped stack, the cornering apparatus 230 includes a slanted, upwardly-extending angle plate guide member (or magazine) 240 for slidably receiving some of the angle plates of the stack. The magazine 240 is preferably inclined at an angle from horizontal sufficient to allow the angle plates to overcome the force of friction against the magazine and thereby allow the angle plates to slide downwardly to the separating mechanism. Because the magazine is inclined, a large number of angle plates can be placed on and supported by the magazine so that the weight of the angle plates will not interfere with the operation of the separator mechanism 236. Only the lower-most angle plates of the stack are entirely supported by the separating mechanism 236.

Referring now to FIGS. 15–23, the separating mechanism 236 comprises a lower separator plate 242, an upper separator plate 244, forward stationary blocks 246 (only one of which is shown in FIGS. 16–23), and a rearward stationary block 248 (only one of which is shown). The lower separator plate 242 is operatively connected to a lower linear actuator 250 (FIG. 15) and the upper separator plate is operatively connected to an upper linear actuator 252. Preferably, the linear actuators 250, 252 are hydraulic or pneumatic cylinders. However, it is to be understood that any type of linear actuator could be employed without departing from the scope of this invention. The stationary blocks 246, 248 are secured to stationary parts of the cornering apparatus 230.

Figure 19:
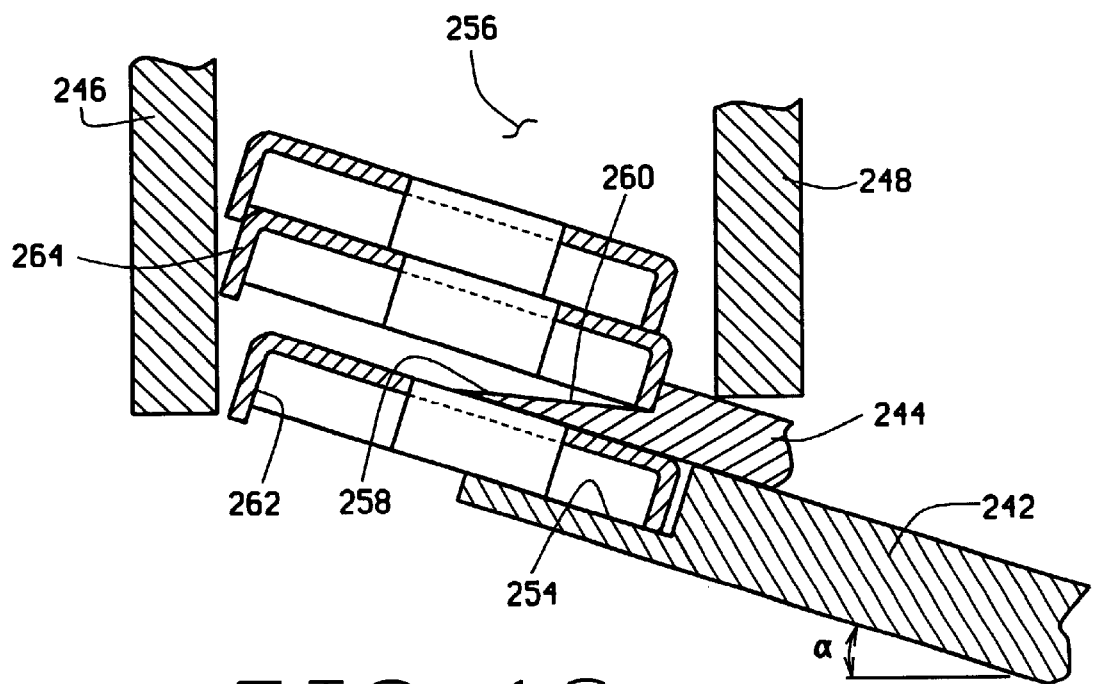
FIG. 19 is a cross-sectional view taken along the plate of line 19—19 of FIG. 18.
Figure 18:
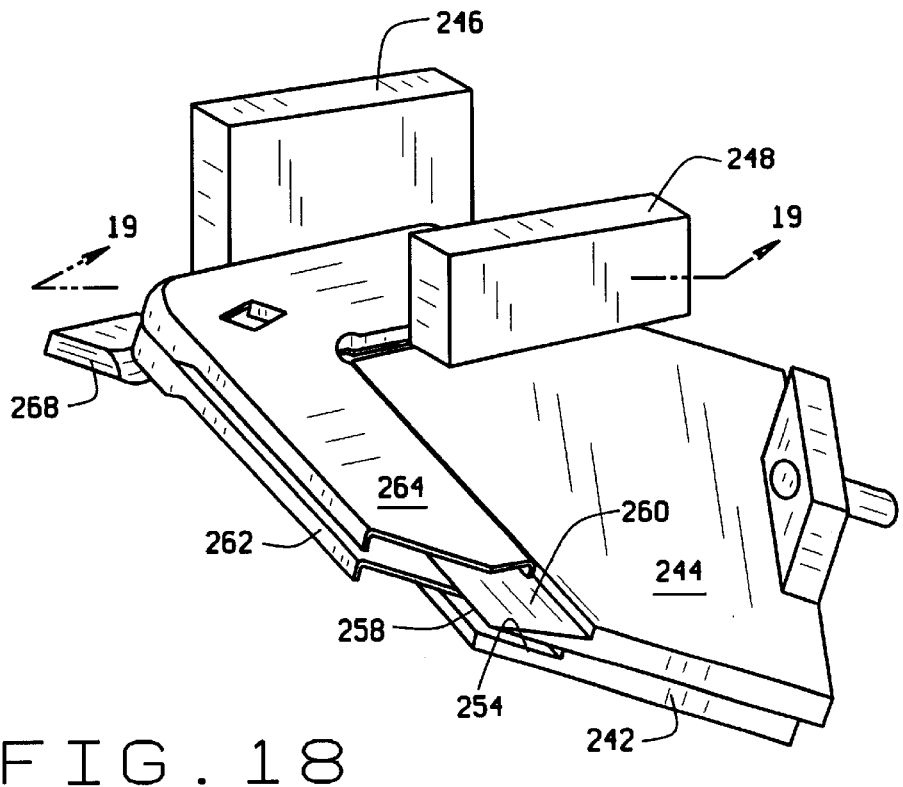
FIG. 18 is a perspective view of the upper and lower separator plates of FIG. 16 with the lower separator plate supporting the bottom-most angle plate and the upper separator plate supporting the next to bottom-most angle plate.
Figure 20:
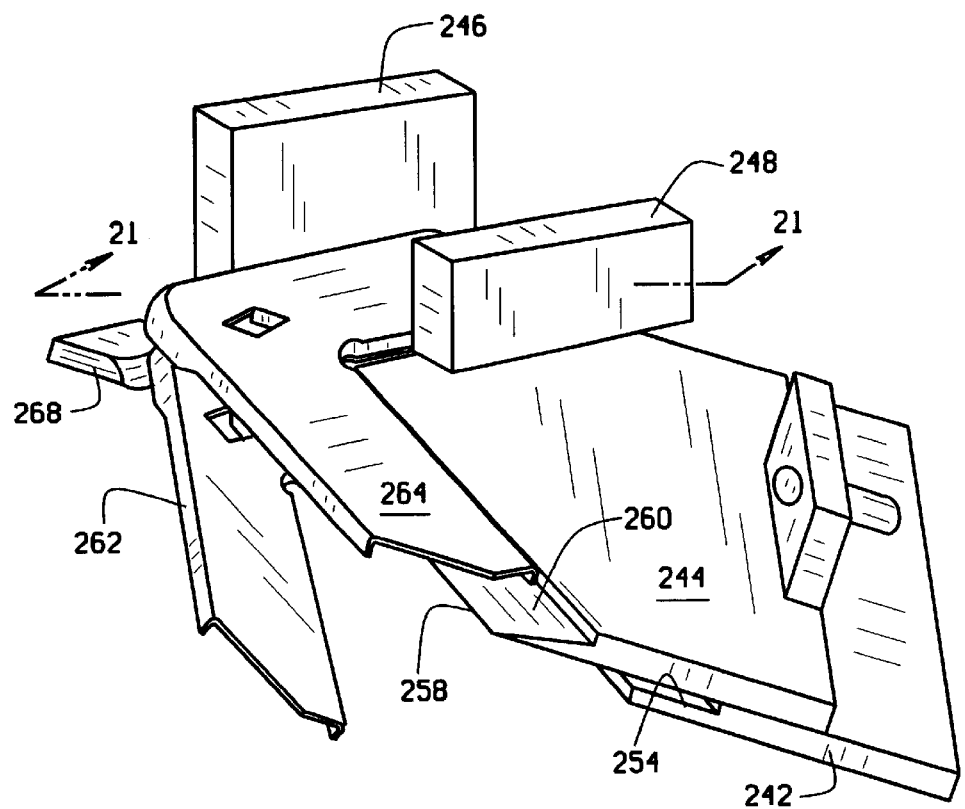
FIG. 20 is a perspective view of the upper and lower separator plates of FIG. 18 with the lower separator plate moved to a release position to allow the bottom-most angle plate to fall from the lower separator plate.
Figure 21:
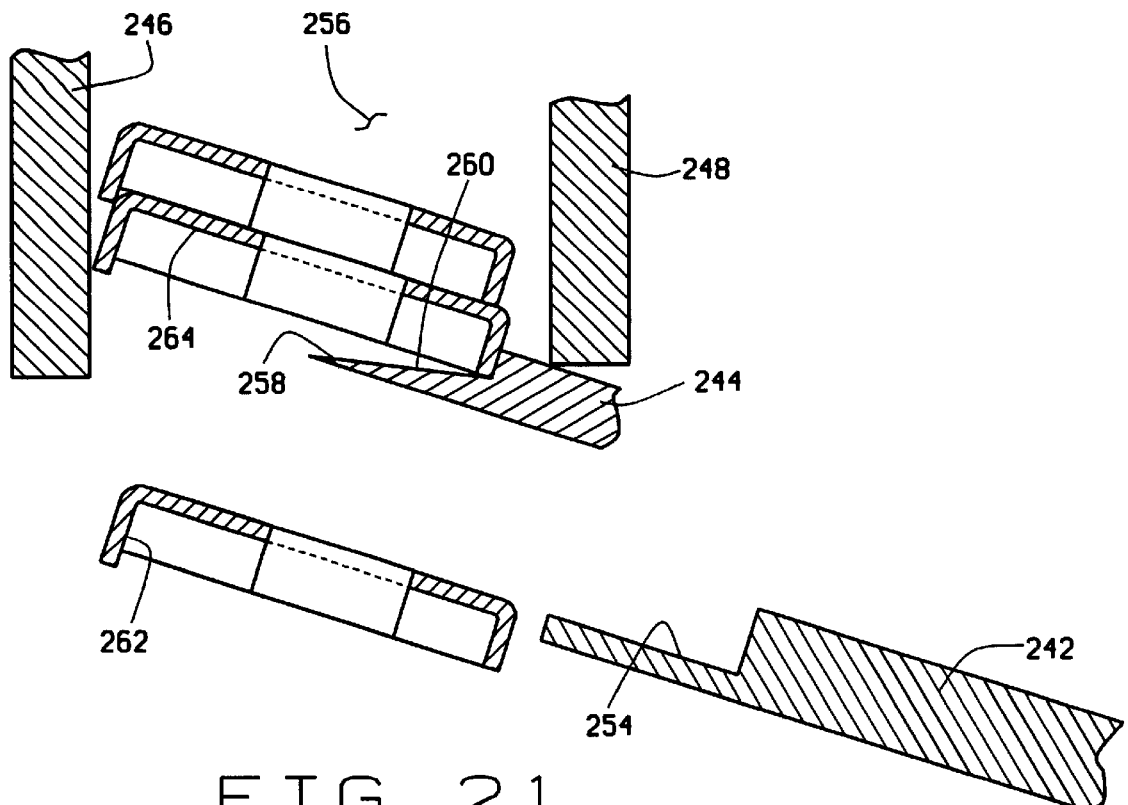
FIG. 21 is a cross-sectional view taken along the plane of line 21—21 of FIG. 20.

The lower separator plate 242 constitutes a first support member of the separating mechanism 236 moveable via the lower linear actuator 250 between a support position (FIGS. 16–19, 22 and 23) and a release position (FIGS. 20 and 21). The lower separator plate 242 is configured to support at least the lower-most angle plate of the stack of angle plates when the lower separator plate is in its support position. The lower separator plate 242 includes an angle-plate receiving shelf 254 at its forward end margin. When the lower separator plate 242 is in its support position, its shelf 254 is positioned directly below an angle plate receiving gap 256 (i.e., the gap between the forward and rearward stationary blocks 246, 248). When the lower separator plate 242 is in its release position, its shelf 254 is positioned under the rearward stationary block 248 and rearward of the angle plate receiving gap 256.

The upper separator plate 244 constitutes a second support member of the separating mechanism 236 and is moveable via the upper linear actuator between a supporting position (FIGS. 18–21) and a release position (FIGS. 16, 17, 22, and 23). The upper separator plate 244 has a knife-shaped forward edge 258 and an angle plate receiving shelf 260 at the forward end margin of the upper separator plate. When the upper separator plate 244 is in its support position, its shelf 260 is positioned directly below the angle plate receiving gap 256. When the upper separator plate 244 is in its release position, its shelf 260 is positioned under the rearward stationary block 248 and rearward of the angle plate receiving gap 256.

Figure 16:
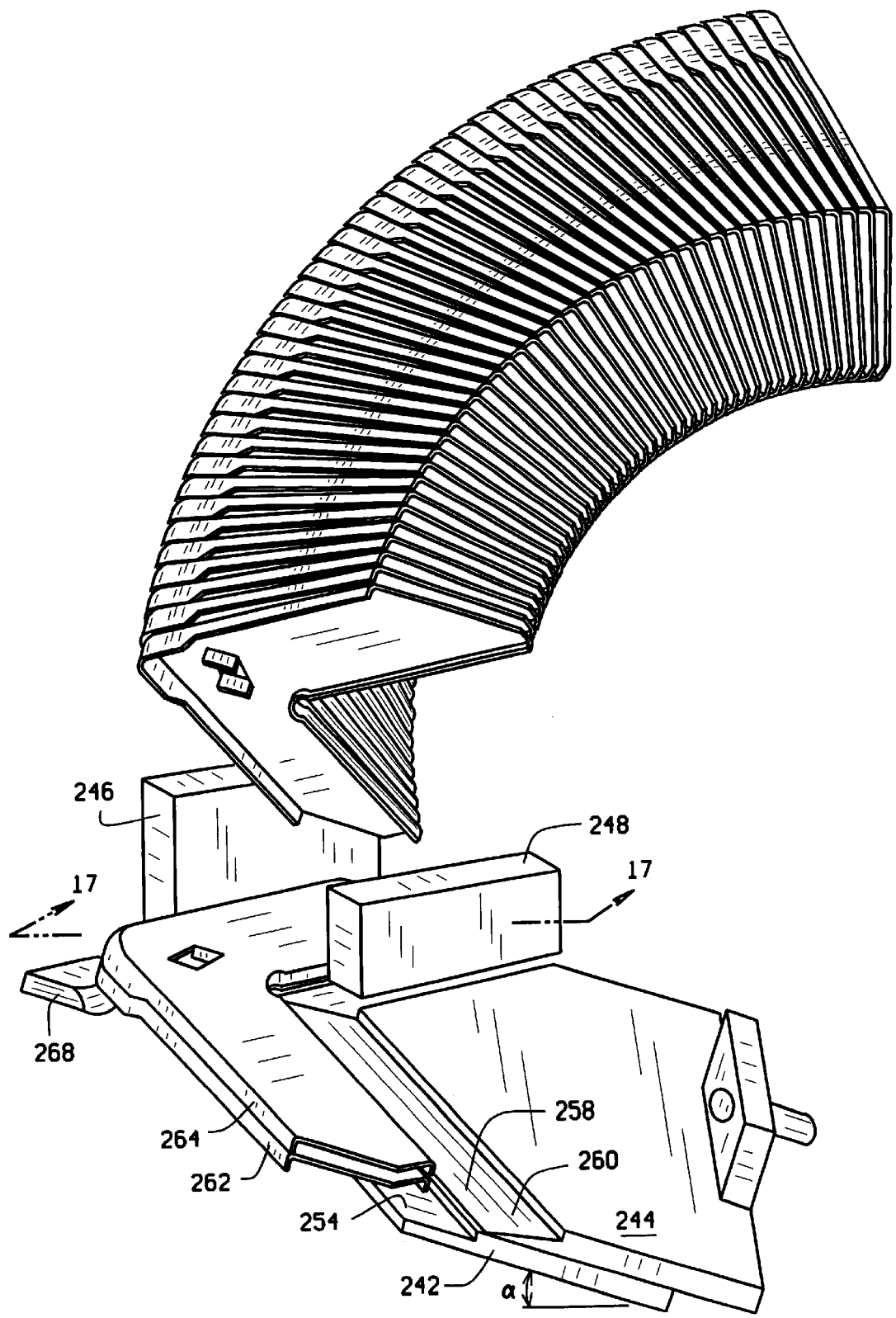
FIG. 16 is an enlarged perspective view of upper and lower separator plates of a separating mechanism of the cornering apparatus of FIG. 15 supporting a stack of angle plates.
Figure 17:
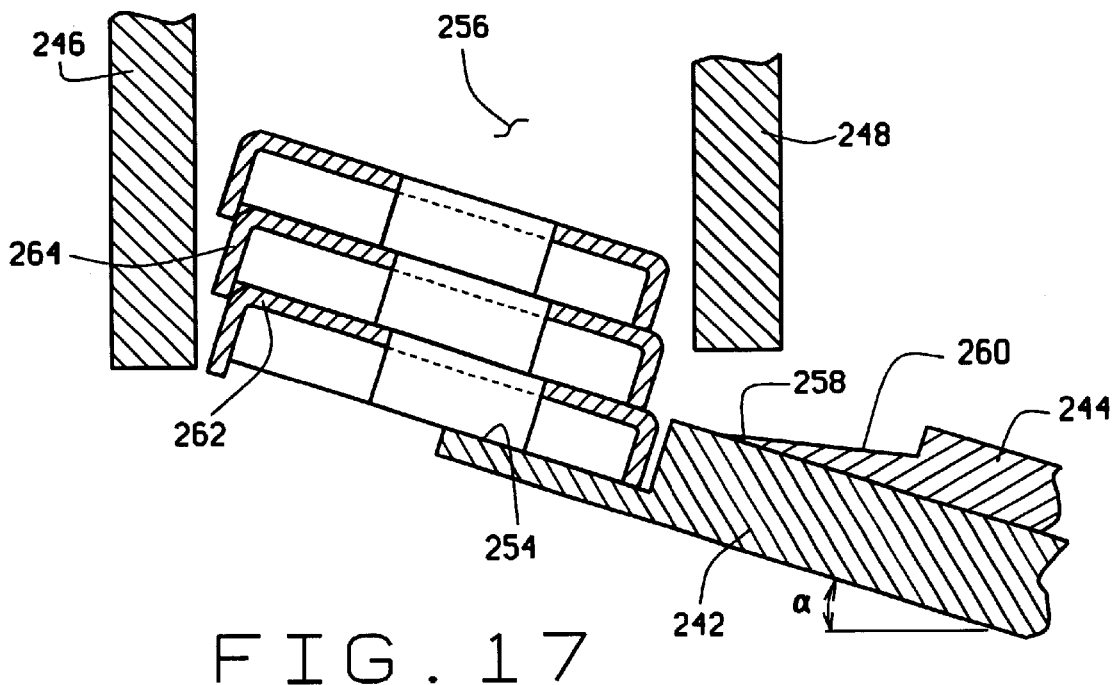
FIG. 17 is a cross-sectional view taken along the plate of line 17—17 of FIG. 16.
Figure 23:
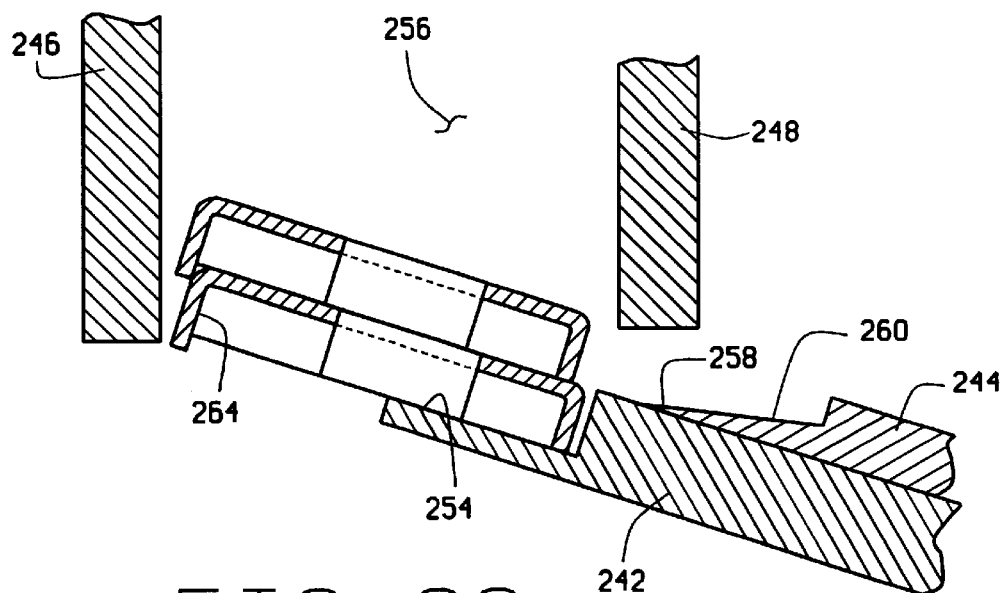
FIG. 23 is a cross-sectional view taken along the plane of line 23—23 of FIG. 22.
Figure 22:
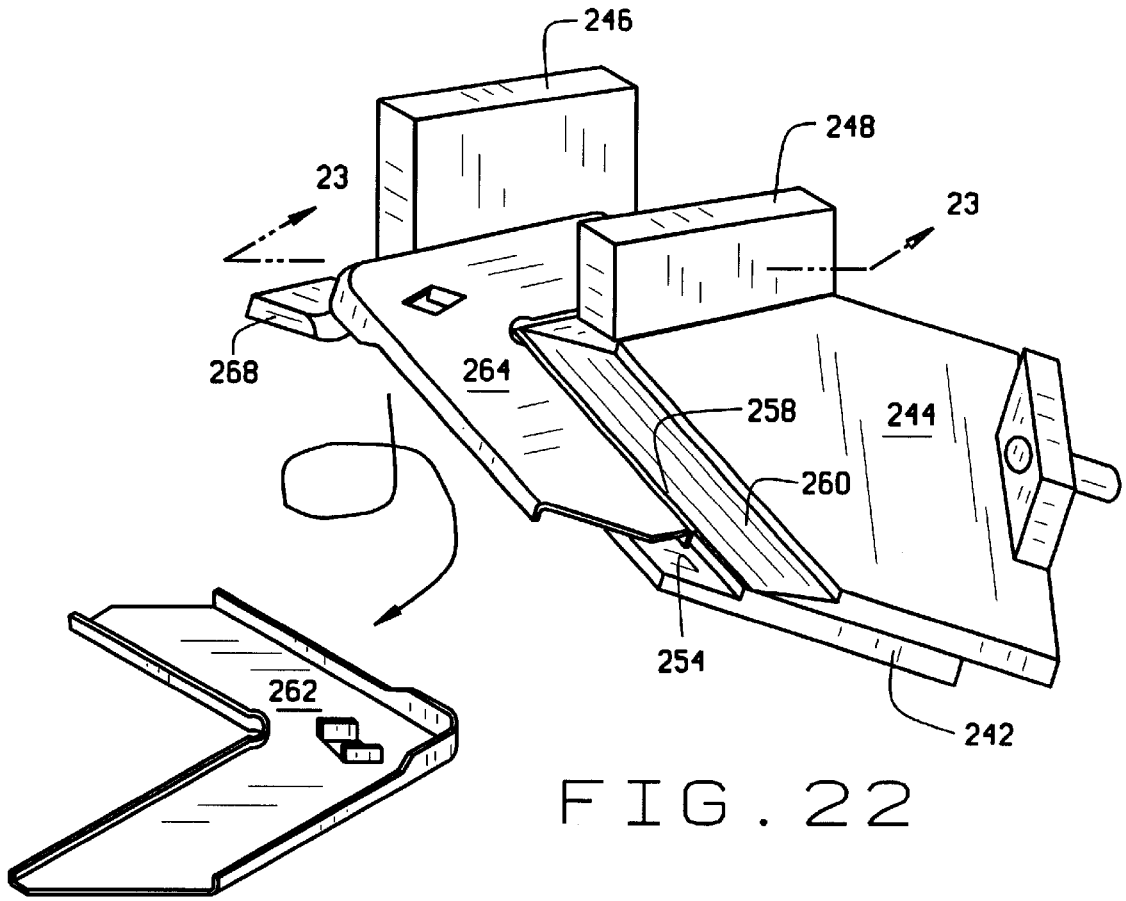
FIG. 22 is a perspective view of the upper and lower separator plates of FIG. 20 with the lower separator plate moved to its support position and the upper separator plate moved to a release position to allow the remaining plates in the stack to move downwardly and be supported by the lower separator plate.

In operation of the separating mechanism 236, the lower separator plate 242 is initially in its support position and the upper separator plate 244 is initially in its release position as shown in FIGS. 16 and 17. For purposes of discussion, the bottom-most angle plate shown in FIGS. 16 and 17 constitutes a first angle plate 262 and the next to bottom-most angle plate constitutes a second angle plate 264. In the position shown in FIGS. 16 and 17, the entire stack of angle plates is supported by the lower separator plate 242. The upper linear actuator 252 then pushes the upper separator plate 244 forward to its support position as shown in FIGS. 19 and 20. As the upper separator plate 244 is moved forward, the knife-shaped forward edge 258 pushes between the first and second angle plates 262, 264 to separate them. The knife-shaped forward edge 258 is configured to separate the first and second angle plates 262, 264 even when the angle plates are stacked in a nested configuration. In the position shown in FIGS. 18 and 19, the lower separator plate 242 supports only the first angle plate 262 and supports it in a lower angle plate position, and the upper separator plate 244 supports the second angle plate 264 in a second angle plate position. Of course, the second angle plate 264 also supports the rest of the angle plates in the stack. The lower linear actuator 250 then moves the lower separator plate 242 rearward to its release position as shown in FIGS. 20 and 21 which causes the first angle plate 262 to fall through a chute 266 (FIG. 15) of the cornering apparatus 230 and onto the pusher plate. An angle plate engaging protrusion 268 extends rearwardly from a stationary part of the separating mechanism 236 and below the forward stationary block 246. The protrusion 268 is sized and positioned so that the apex of an angle plate falling into the chute 266 hits the protrusion in a manner to cause the angle plate to flip over and land right-side-up as shown in FIG. 22. In other words, the angle plate lands on the pusher plate in an inverted position and with its apex facing rearwardly. Thus, the angle plate is properly positioned to be advanced into registration with the flanges of the duct. After the first angle plate 262 is dropped onto the pusher plate, the lower separator plate 242 is moved to its support position and then the upper separator plate 244 is moved to its release position as shown in FIGS. 22 and 23. Movement of the separator plates 242, 244 from the positions shown in FIGS. 20 and 21 to the positions shown in FIGS. 22 and 23 cause the second angle plate 264 to move from the second angle plate position to the lower angle plate position. Likewise, the other plates of the stack of plates move downward with the second angle plate 264. Thus, the cornering apparatus 230 is operable to remove angle plates from a stack of angle plates and securely insert them in the flanges of ducts.

The lower and upper separator plates 242, 244 are preferably inclined and are moved via the linear actuators 250, 253 along planes which are inclined at an angle α from horizontal. Preferably, the angle of inclination α is at least 10°. Because of this angle of inclination, the second angle plate 264 and the rest of the stack of angle plates are pushed upwardly by the upper separator plate 244 to move the second angle plate away from the first angle plate 262. This upward movement of the second angle plate 264 reduces the chances that the second angle plate will bind against the first angle plate 262, and thereby reduces the chances that the second angle plate will interfere with separation of the first and second angle plates.

Figure 24:
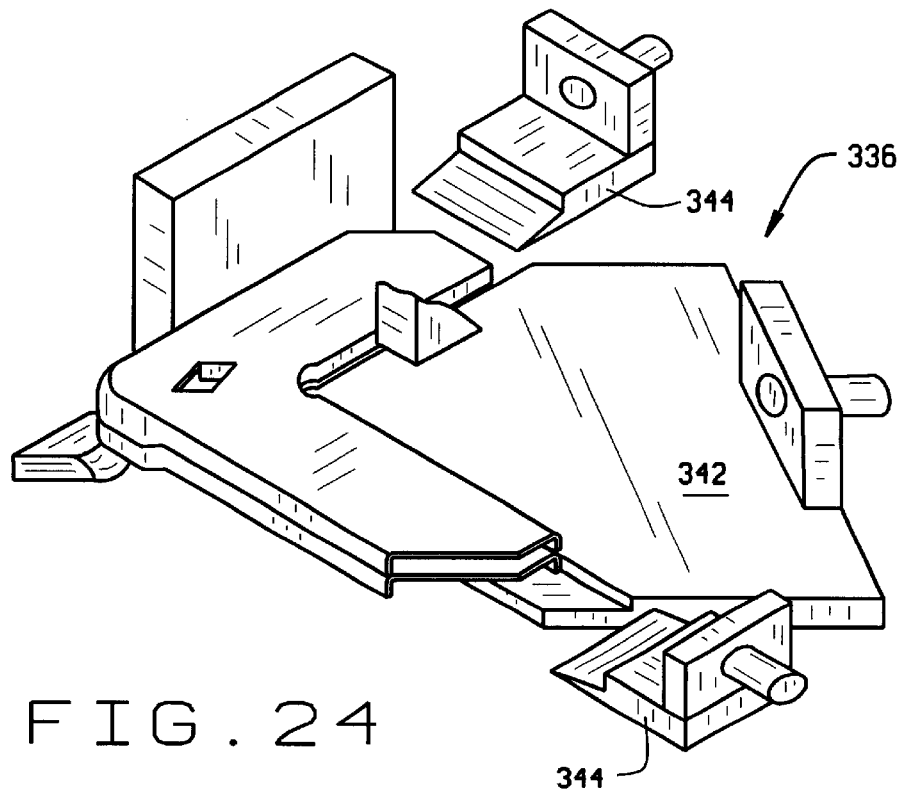
FIGS. 24–26 are enlarged perspective views of the separator plates of another separating mechanism of the present invention.
Figure 25:
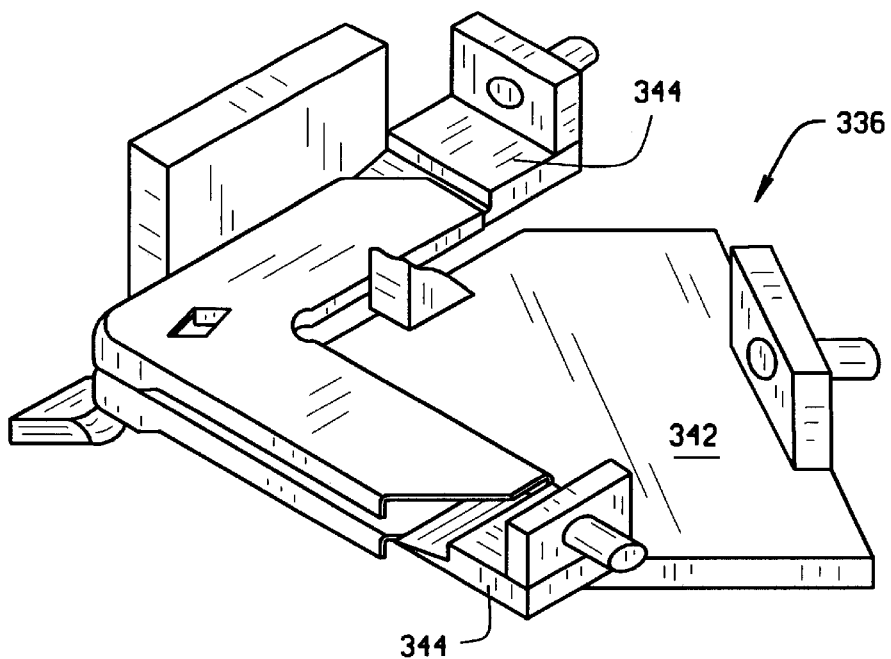
Figure 26:
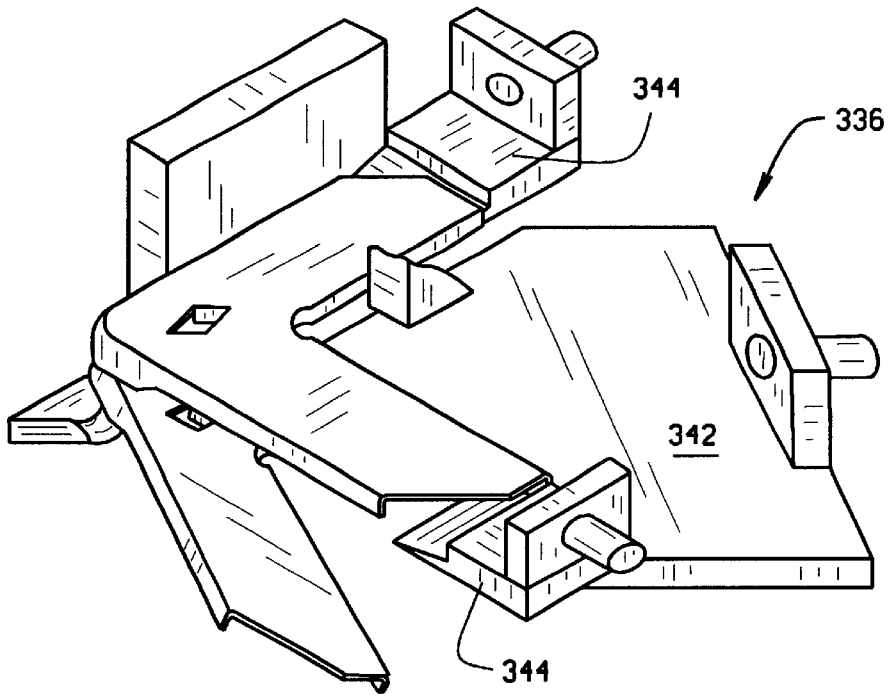

Referring now to FIGS. 24–26, another separating mechanism of the present invention is indicated generally at 336. The separating mechanism 336 includes a lower separator plate 342 and a pair of upper separator plates 344. The lower separator plate 342 is identical to the lower separator plate 242 of FIGS. 16–23 and operates in the same manner. The upper separator plates 344 are moveable along oblique axes between supporting and release positions, and are so moved by a pair of upper linear actuators (not shown). The upper separator plates 344 provide the same function as the upper separator plate 244 of FIGS. 16–23, but they extend into the ends of the angle plates instead of the backs of the angle plates. Thus, the above-description of the separator mechanism 236 is similarly applicable to the separator mechanism 336 of this embodiment.

Although the present invention has been described with several embodiments, it is to be understood that other embodiments could be employed without departing from the scope of this invention. For example, a separator mechanism could employ two lower separator plates each of which engages an end of an angle plate. Also, a cornering apparatus of the present invention could be made to insert angle plates into upper flanges of a duct at the same time it inserts angle plates into lower flanges of the duct.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of placing an angle plate in channel shaped flanges of a duct, the method comprising:

holding the duct via a duct holding mechanism;

moving the angle plate into registration with the flanges of the duct as the duct is held via the duct holding mechanism;

pressing the angle plate against the flanges of the held duct; and moving a crimping member along a straight line and into engagement with at least one of the flanges of the duct to crimp said at least one of the flanges in a manner to block removal of the angle plate from said at least one of the flanges.

2. A method as set forth in claim 1 further comprising placing a plurality of angle plates in an angle plate holder in a manner so that the angle plates form a stack of angle plates with a first one of the angle plates of the stack being in a lower plate position, said first one of the angle plates being the bottom-most angle plate of the stack when it is in the lower plate position, a second one of the angle plates of the stack being in a second plate position generally above the lower plate position when the first one of the angle plates is in the lower plate position, the angle plate holder including an upwardly-extending angle plate guide surface slanted relative to horizontal for slidably receiving at least some of the angle plates of the stack so that said at least some of the angle plates are supported in a non-vertical arrangement, the step of moving the angle plate into registration with the flanges of the duct comprising moving the first one of the angle plates from the stack into registration with the flanges of the duct, the method further comprising allowing the second one of the angle plates to move from the second plate position to the lower plate position so that at least some of the angle plates of the stack slide generally downwardly along a slanted pathway defined by the angle plate guide surface.

3. A method of placing an angle plate in channel shaped flanges of a duct, the method comprising:

placing a plurality of angle plates in an angle plate holder in a manner so that the angle plates form a stack of angle plates with a first one of the angle plates of the stack being in a lower plate position, said first one of the angle plates being the bottom-most angle plate of the stack when it is in the lower plate position, a second one of the angle plates of the stack being in a second plate position generally above the lower plate position when the first one of the angle plates is in the lower plate position, the angle plate holder including an upwardly-extending angle plate guide surface slanted relative to horizontal for slidably receiving at least some of the angle plates of the stack so that said at least some of the angle plates are supported in a non-vertical arrangement;

holding the duct via a duct holding mechanism;

moving the first one of the angle plates from the stack into registration with the flanges of the duct as the duct is held via the duct holding mechanism; and pressing the angle plate against the flanges of the held duct;

allowing the second one of the angle plates to move from the second plate position to the lower plate position in a manner so that at least some of the angle plates of the stack slide generally downwardly along a slanted pathway defined by the angle plate guide surface as the second one of the angle plates moves from the second plate position to the lower plate position.

4. A method as set forth in claim 3 further comprising moving a crimping member laterally along a line and into engagement with at least one of the flanges of the duct to crimp said at least one of the flanges in a manner to block removal of the angle plate from said at least one of the flanges.

5. A method of placing an angle plate in channel shaped flanges of a duct, the method comprising:

placing a plurality of angle plates in an angle plate holder in a manner such that the angle plates form a stack of angle plates with a first one of the angle plates of the stack being in a lower plate position, said first one of the angle plates being the bottom-most angle plate of the stack when it is in the lower plate position, a second one of the angle plates of the stack being in a second plate position generally above the lower plate position when the first one of the angle plates is in the lower plate position, the angle plate holder including an upwardly-extending angle plate guide surface slanted relative to horizontal for slidably receiving at least some of the angle plates of the stack such that said at least some of the angle plates are supported in a non-vertical arrangement, the angle plates being positioned such that said at least some of the angle plates are slanted relative to the lower plate position and slanted relative to the second plate position;

holding the duct via a duct holding mechanism;

moving the first one of the angle plates from the stack into registration with the flanges of the duct as the duct is held via the duct holding mechanism; and pressing the angle plate against the flanges of the held duct;

allowing the second one of the angle plates to move from the second plate position to the lower plate position in a manner such that at least some of the angle plates of the stack slide generally downwardly along a slanted pathway defined by the angle plate guide surface as the second one of the angle plates moves from the second plate position to the lower plate position.

6. A method as set forth in claim 5 further comprising moving a crimping member laterally along a straight line and into engagement with at least one of the flanges of the duct to crimp said at least one of the flanges in a manner to block removal of the angle plate from said at least one of the flanges.

* * * * *